May 22, 1951        H. W. PRICE        2,554,314

TRANSMISSION AND CLUTCH OPERATING POWER MEANS

Original Filed May 11, 1942        8 Sheets-Sheet 1

INVENTOR.
HAROLD W. PRICE
BY H. O. Clayton
ATTORNEY

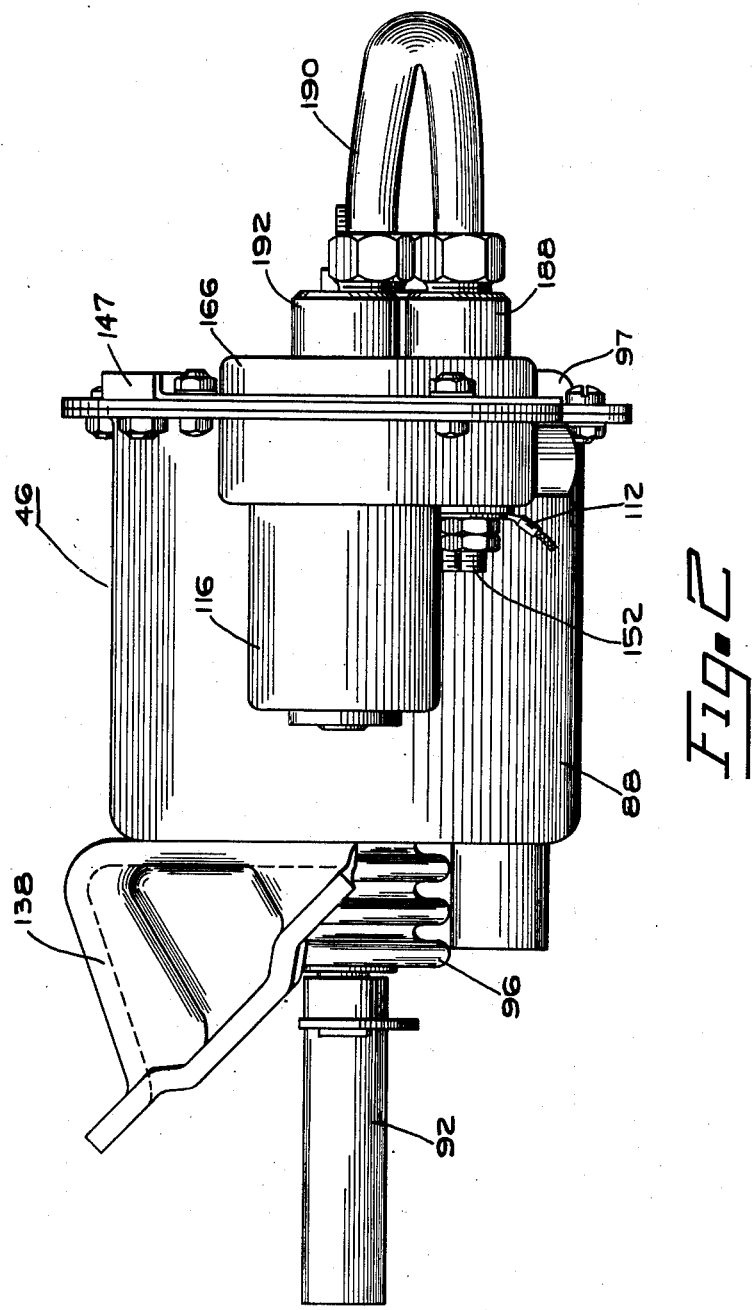

INVENTOR
BY HAROLD W. PRICE
ATTORNEY

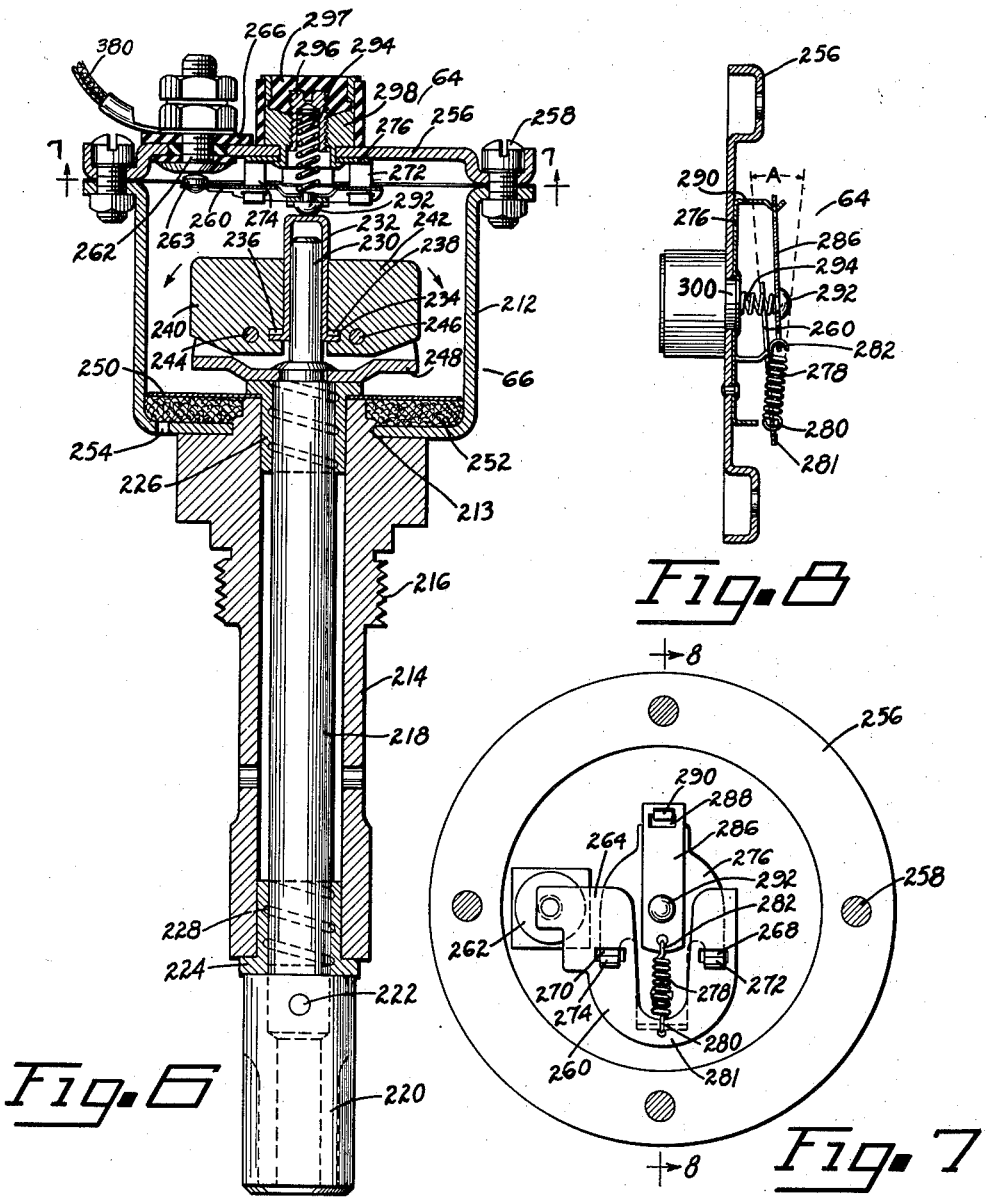

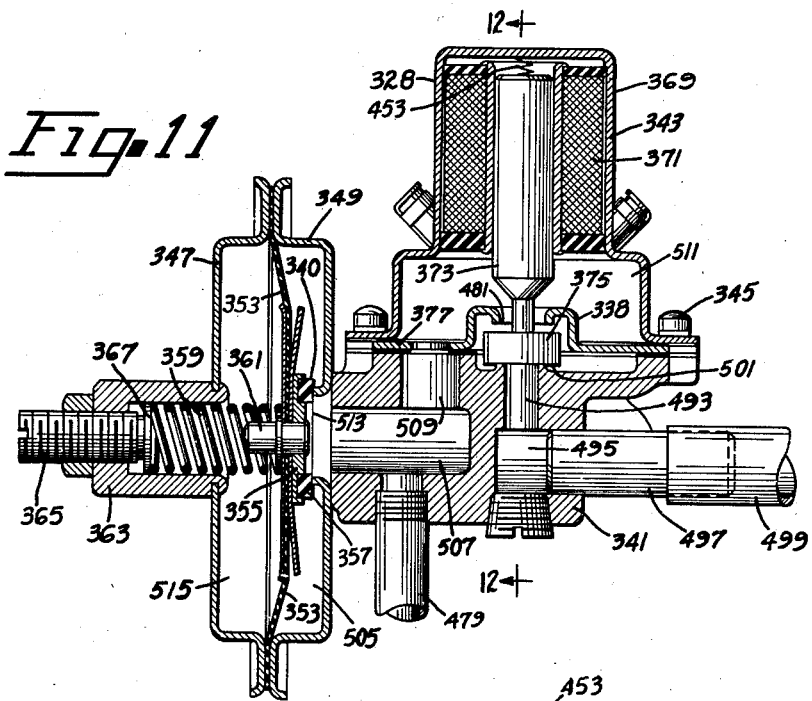
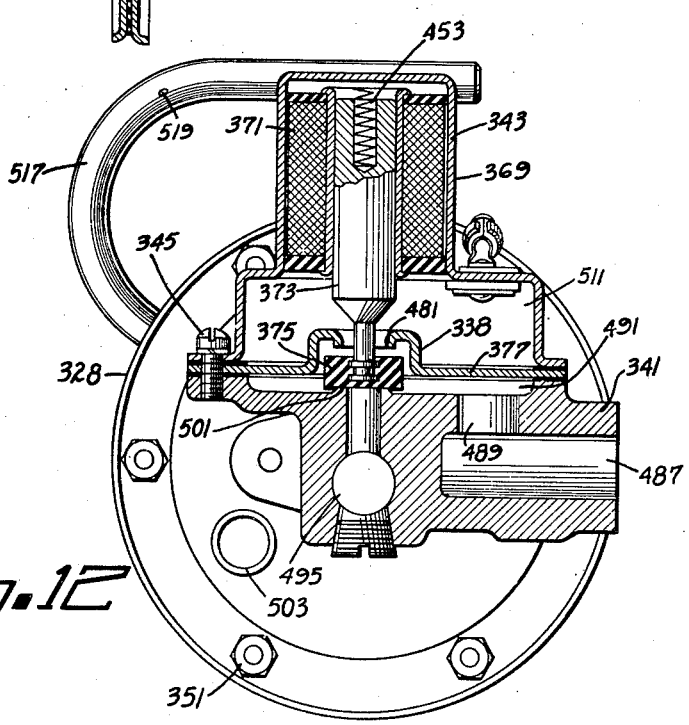

May 22, 1951 H. W. PRICE 2,554,314
TRANSMISSION AND CLUTCH OPERATING POWER MEANS
Original Filed May 11, 1942 8 Sheets-Sheet 7
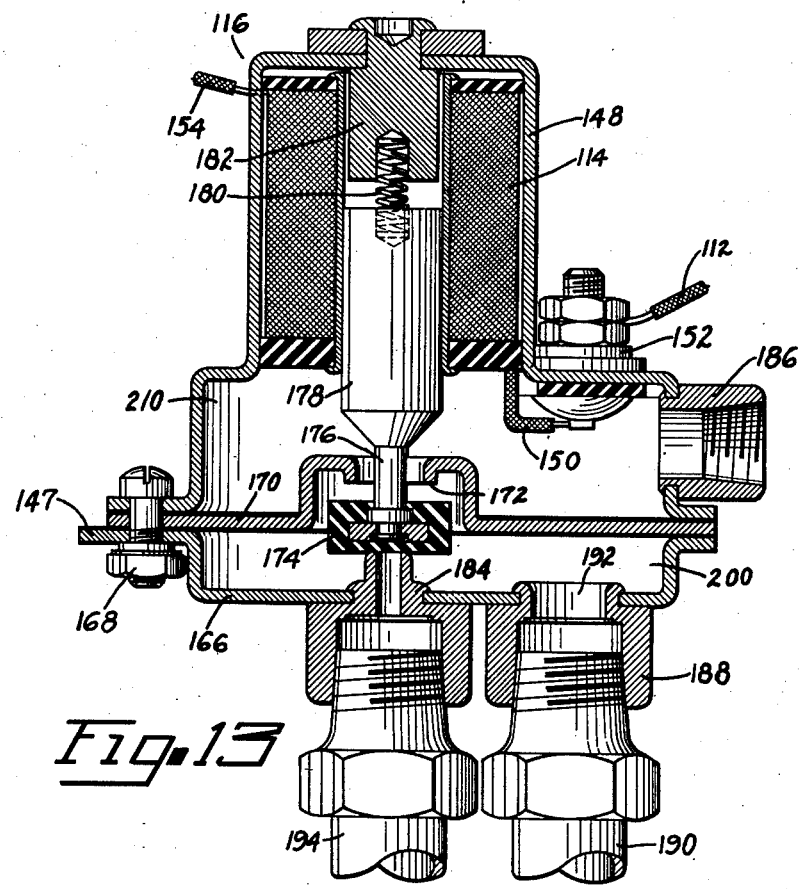
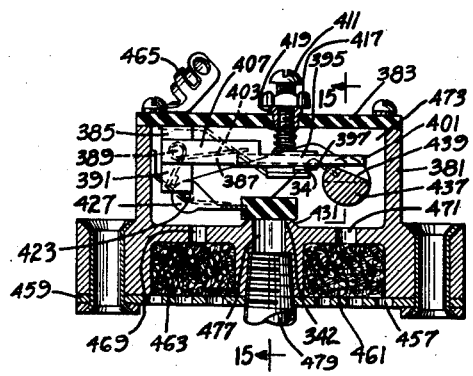
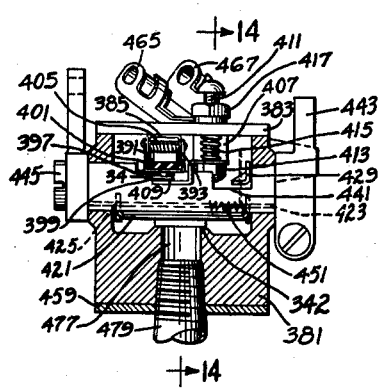
INVENTOR
HAROLD W. PRICE
BY
ATTORNEY

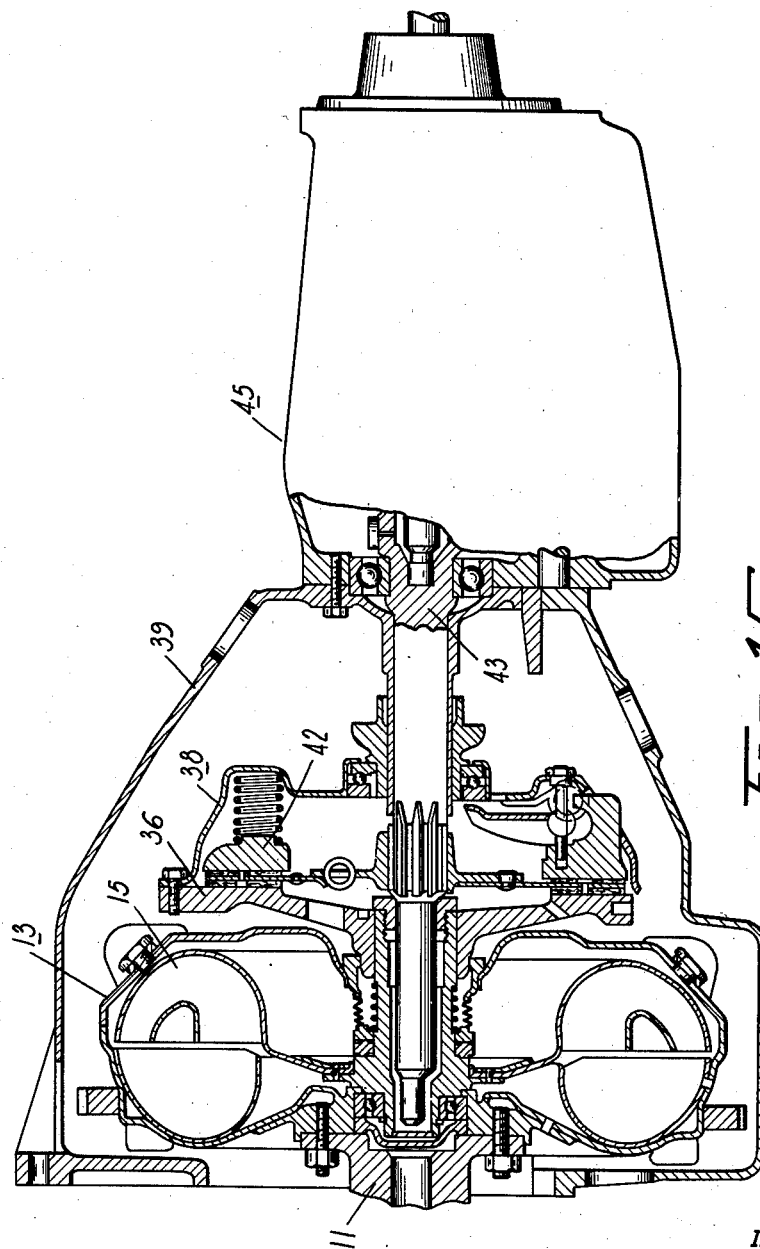

Patented May 22, 1951

2,554,314

UNITED STATES PATENT OFFICE 2,554,314

TRANSMISSION AND CLUTCH OPERATING POWER MEANS

Harold W. Price, South Bend, Ind., assignor to Bendix Aviation Corporation, South Bend, Ind., a corporation of Delaware Original application May 11, 1942, Serial No. 442,465. Divided and this application March 27, 1944, Serial No. 528,235

13 Claims. (Cl. 192—.073)

This invention relates to motor vehicles and more particularly to improvements in the transmission of power from the engine to the driving wheels of a motor vehicle.

It is customary, in connection with the drive for motor vehicles, to provide a speed ratio changing transmission for varying the driving ratio between the engine and the vehicle driving ground wheels, and my invention is in part directed to power means automatically operable, when the accelerator or other manually operated engine control means is depressed slightly beyond the fully opened throttle position, to cut out of operation the engine controlling ignition system as the transmission is being power operated to uncouple the engine of the vehicle and the driving wheels thereof and then to so operate the transmission as to lower the speed ratio between the engine and the driving ground wheels and to again render the ignition operative to effect a speeding up of the engine just prior to the completion of said operation of the transmission.

It follows, therefore, that my invention is directed to means for automatically effecting a change in the transmission speed ratio at a time when the internal combustion engine is incapable, at the then existing setting of the transmission and despite a fully opened position of its throttle, of either maintaining or increasing the speed of the vehicle. Such a lowering of the speed ratio will also probably prevent a choking of the engine should the vehicle be climbing a steep hill.

The principal object of my invention is to provide, in an automotive vehicle having a power plant comprising an internal combustion engine, an ignition system, a friction clutch and a change-speed transmission, power means for disengaging said clutch and establishing said transmission in one or the other of two settings said means serving to automatically disengage the friction clutch and establish the transmission in one of its settings when the speed of the vehicle is reduced to a certain factor, to automatically establish the transmission in the latter setting when the car is traveling below a certain speed and the accelerator is fully or substantially fully depressed said operation being facilitated by a momentary disabling of the ignition system, and to automatically establish the transmission in the other of the two aforementioned settings when the accelerator is fully or substantially fully released and the car is traveling at or above a certain speed. It is a further object of my invention to combine, with the aforementioned mechanism, a fluid coupling said coupling serving to facilitate the last mentioned operation of the mechanism.

In carrying out the above objects of my invention I have, in a preferred embodiment of my invention, provided a friction clutch operating pressure differential operated motor, a valve for controlling the operation of said motor, a simple and compact pressure differential and spring operated transmission operating motor unit including a control valve, a power element, an ignition interrupter switch and an electromagnet or so called holding coil, means for actuating the latter valve, a relay mechanism for controlling the operation of the ignition interrupter switch, the holding coil and valve actuating means and means for controlling the operation of the relay mechanism and the first mentioned valve including a vehicle speed responsive governor and a switch operated thereby, an accelerator operated switch mechanism, another switch and means for operating the same the operation of which is dependent upon the speed of the engine.

Yet another object of my invention is to provide, in the power plant of an automotive vehicle, power means for effecting either a so-called kickdown or an upshift operation of a change-speed transmission, the kickdown operation being facilitated, if this operation is effected when the vehicle is traveling at or above a certain speed, by an operation of the power means to momentarily disable the ignition system of the engine of the vehicle and thereby reverse the torque of said engine, said kickdown or downshift operation of the transmission being facilitated, if this operation is effected when the vehicle is traveling below a certain relatively low speed, by a power disengagement of a friction clutch to thereby uncouple the engine from the transmission. An important feature of this part of my invention lies in the construction and arrangement of the parts of the clutch and transmission operating and ignition controlling power means, said parts including a single means, preferably a vehicle speed responsive governor, which serves to control that part of the power means which operates the friction clutch and that part of the power means which operates the transmission; said parts further including a switch mechanism, also operated by a single means, preferably the accelerator, operative to control both of the aforementioned parts of the power means.

Yet another object of my invention is to provide a power plant for an automotive vehicle including a manually and power operated friction clutch, a fluid coupling and a manually and power operated change-speed transmission, said power plant being operative to effect, by depressing the accelerator and without manually operating the clutch, a smooth start of the vehicle from rest after the transmission has been manually operated to establish the same in a relatively low gear setting and to thereafter effect, after the transmission has been manually operated to establish a certain setting thereof, an operation of the transmission by power means without operating the clutch.

Yet another object of my invention is to provide a spring and fluid pressure operated power means for operating the change speed transmission of an automotive vehicle to alternately establish the transmission first in one and then the other of two settings, said power means including means for reversing the engine torque to facilitate the operation of the transmission and further including a minimum of controls.

Other objects of the invention and desirable details of construction of parts will become apparent from the following detailed description of certain embodiments of the invention, taken in conjunction with the accompanying drawings illustrating said embodiments, in which:

Figure 2 is a side view of the motor unit disclosed in the embodiment of my invention shown in Figure 1, said unit constituting the principal element of my invention;

Figure 6 is a longitudinal sectional view showing details of the governor and governor operated switch mechanism constituting a part of the embodiment of my invention disclosed in Figure 1;

Figure 7 is a view looking in the direction of the arrows 7—7 of Figure 6, disclosing the switch mechanism of the governor and switch unit disclosed in said figure;

Figure 8 is a sectional view taken on the line 8—8 of Figure 7 disclosing certain details of the switch mechanism of Figure 6;

Figure 11 is a sectional view, taken on the line 11—11 of Figure 9, of the valve mechanism of Figures 9 and 10 disclosing the details thereof;

Figure 12 is a sectional view taken on the line 12—12 of Figure 11;

Figure 13 is a sectional view disclosing the details of the three-way control valve and valve operating solenoid of the transmission operating and ignition controlling motor unit disclosed in Figures 2 and 3;

Figure 14 is a sectional view, taken on the line 14—14 of Figure 15, of the accelerator operated switch and second stage bleed valve mechanism of the clutch control mechanism disclosed in Figure 1;

Figure 15 is a sectional view of the valve and switch mechanism of Figure 14 taken on the line 15—15 thereof; and Figure 16 is a sectional view disclosing details of a fluid coupling, a friction clutch and a portion of a change speed transmission the latter mechanism being actuated in part by the motor means of my invention.

Figure 1:
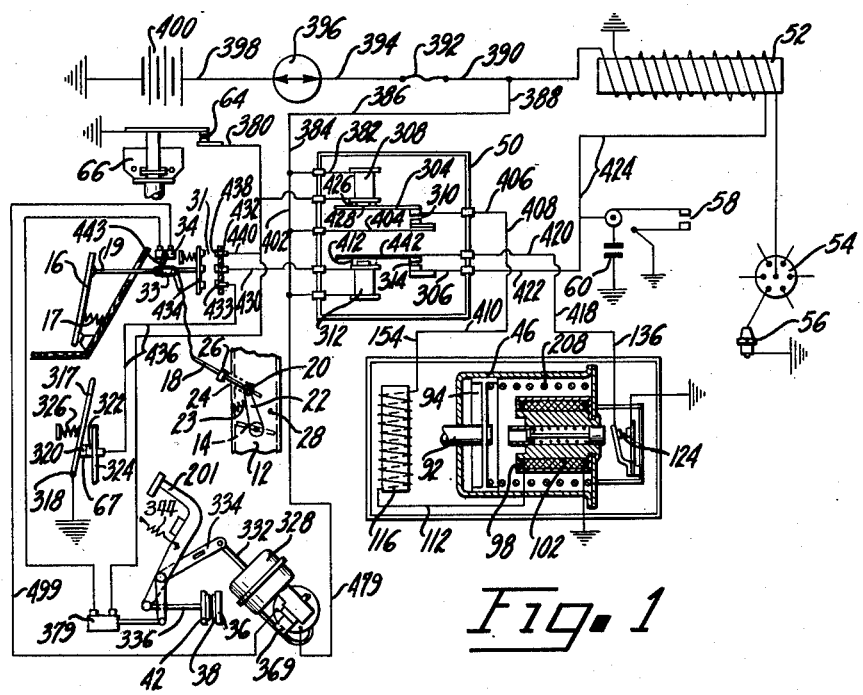
Figure 1 is a diagrammatic view of a preferred embodiment of the clutch and transmission operating and ignition controlling power means constituting my invention.

The transmission, friction clutch and ignition controlling mechanism constituting my invention and disclosed in my parent co-pending application No. 442,465 filed May 11, 1942, may be employed in conjunction with various types of motor vehicle power plants including a friction clutch, a change-speed transmission and an ignition system for in part controlling the operation of the internal combustion engine of the plant; however, in order to illustrate the use of one embodiment of my invention in this divisional application, I have shown the same incorporated in the power plant diagrammatically disclosed in Figure 1. This power plant includes a carburetor 12 and a throttle valve 14 which is operated by an accelerator 16. The accelerator, which is biased to its throttle closed position by a spring 17, is preferably connected to the throttle by means of a rod 18, one end of which extends through an opening in an enlarged end portion 20 of a throttle operating crank 22. This crank is returned to its throttle closed position by a spring 23. A spring 24, stronger than the spring 23 and sleeved over the rod 18, is interposed between the end portion 20 and a stop 26 secured to the rod 18. By means of this construction the throttle is opened when the accelerator is depressed and when the throttle reaches its full open position against a stop 28 any additional movement of the accelerator results in a compression of the spring 24 and a closing of a three-pole electrical switch 31. The function of the switch 31 will be described hereinafter. It is also to be noted that by virtue of a pin and slot lost motion connection 33 an accelerator operated clutch control breaker switch 34 is opened during the first increment of throttle opening movement of the accelerator and before the throttle begins to open. The relative timing of operation of the switches 31 and 34 and the throttle 14 will be more completely described hereinafter.

As disclosed in Figure 16 the crank shaft 11 of the engine may be connected to the impeller of a fluid coupling 13 of conventional design, the vane runner 15 of which is connected to the driving member 36 of a friction clutch 38 of conventional design. The fluid coupling and friction clutch are preferably housed within a casing 39. The driven member 42, that is the driven plate of the friction clutch, is connected to a transmission driving shaft carrying the usual main driving pinion 43. The transmission mechanism, indicated by the reference numeral 45, is of the change-speed type, that is a mechanism including gears or their equivalent for effecting a plurality of different speed ratios in the driving relation between the internal combustion engine or other prime mover and the propeller shaft of the vehicle. Such a speed ratio varying transmission includes positively engageable drive control elements at least one of which is movable into engaging relation with another of said elements to effect a drive from the engine to the vehicle propeller shaft driving member of the transmission and into disengaging relation with respect to said element to release said drive. These two elements when engaged are subject to thrust application therebetween during the driving operation; accordingly, they resist relative disengagement until such time as the thrust application is relieved. When the engine acting as a prime mover is driving the vehicle and a change-speed operation of the transmission is desired then before the aforementioned movable element may be moved out of engagement with the element meshed therewith the driving torque or driving load of the engine must be substantially reduced.

My invention in one of its aspects is directed to power means for effecting a movement of the aforementioned movable drive control element to one or the other of two operative positions, hereinafter called the upshift position or the kickdown position, to thereby establish one or the other of two different gear ratios or more broadly stated, speed ratio settings of the speed ratio transmission. The transmission mechanism may of course include other means including a manually operable shift lever positioned under the steering wheel, for manually operating the transmission to establish certain drive ratio settings thereof. In the operation of the transmission, in conjunction with the operation of the mechanism disclosed in Figure 1, either a relatively low or a relatively high gear ratio setting of the transmission is effected by an operation of said manually operated shift lever. The power means of my invention is also operative to suspend for a limited time the operation of the engine driven driving member of the aforementioned relatively movable members and this operation facilitates an operation of the power means to effect the aforementioned kickdown operation of the transmission.

In the preferred embodiment of my invention disclosed in Figure 1 this brief suspension of the driving operation is automatically effected, when the accelerator is released to close the switch 34 and the speed of the vehicle is lowered to or below a predetermined factor, by disengagement of the friction clutch by means of a pressure differential operated motor. As will be brought out hereinafter the mechanism of Figure 1 is also operative to momentarily disable the ignition system when a kickdown operation of the transmission is effected by fully depressing the accelerator to close the switch 31.

Referring again to Figure 1 there is disclosed a pressure differential and spring operated motor unit 46 the power element 96 of which is operably connected by a rod 92 to a crank, not shown, extending from the casing of the change-speed transmission 45. This crank is of course connected to the above discussed movable drive control element of the transmission mechanism. When the crank is moved by a pressure differential operation of the motor unit 46 to one of its two positions then at that time the transmission is established in its upshift position; and when said motor unit is energized by the expansion of a spring 208, Figures 1 and 5, there is effected the kickdown operation of said unit and the crank is moved by this operation to the other of its two operative positions.

Continuing the description of the mechanism disclosed in Figure 1 the transmission and friction clutch operating and ignition controlling power means, and the most essential parts of the engine controlling ignition system include the aforementioned pressure differential and spring operated motor unit 46 disclosed in detail in Figures 4 and 5, a relay mechanism 50 for controlling the operation of the hereinafter described electrical units in the motor unit, an ignition coil 52, a distributor 54 electrically connected to grounded spark plugs, one of which is indicated by the reference numeral 56, a grounded breaker switch 58, a grounded condenser 60 and means for controlling the operation of the electromagnets of the relay, said means including a grounded breaker switch 64 operated by a vehicle speed responsive governor 66, the aforementioned breaker switch 31 operated by the accelerator 16 and a hereinafter described grounded limit switch 67.

Figure 4:
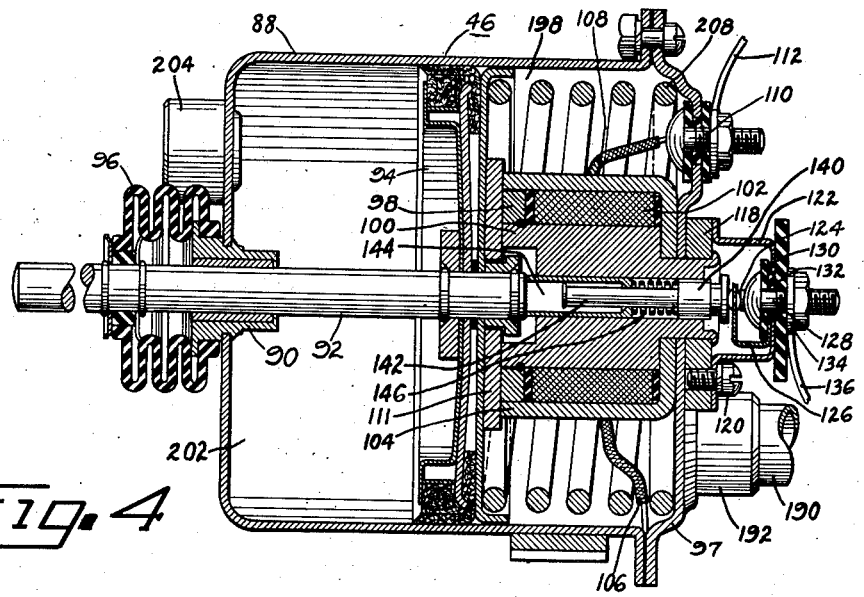
Figure 4 is a sectional view of the motor unit of Figures 2 and 3 disclosing the parts of the mechanism in their upshift position.
Figure 5:
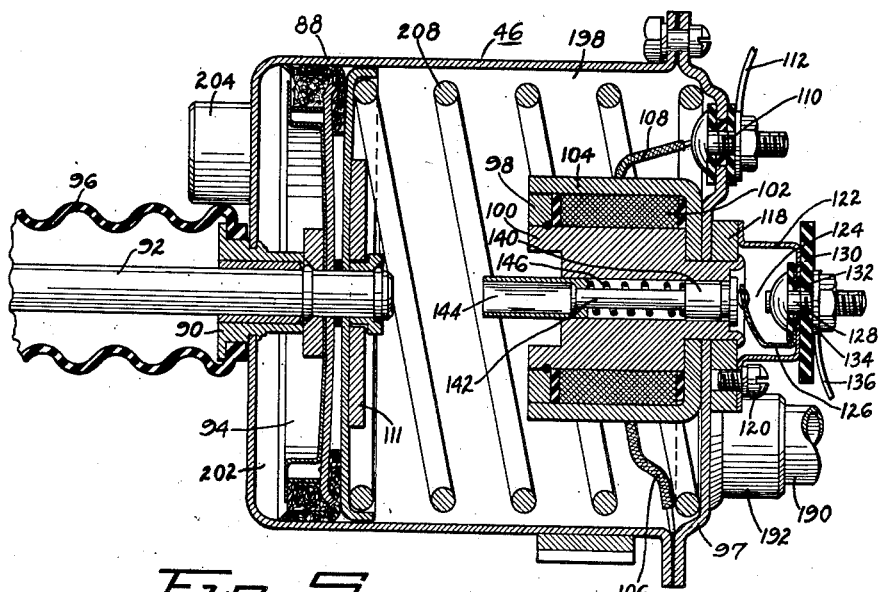
Figure 5 is a view similar to Figure 4 disclosing the parts of the motor unit in their downshift position.

Referring now to Figures 4 and 5 disclosing the details of the transmission operating and ignition controlling motor unit 46 of Figure 1 this unit includes a cup-shaped casing member 88, the base of said member, that is, one of the end walls of the motor unit, being provided with an opening to receive a bearing member 90, which slidably receives a rod 92 pivotally connected at one of its ends to the transmission operating crank, not shown, and at its other end fixedly secured to the central portion of a piston 94. Any other suitable power element such as a flexible diaphragm fixedly secured to the casing member 88 may be substituted for this piston. The usual flexible boot 96 of any suitable material, such as rubberized fabric or rubber substitute, interconnects the bearing 90 and the rod. To the peripheral portion of the cup-shaped casing member 88 there is detachably secured a plate 97 constituting the other end wall of the motor unit and to the inner face of said wall there is secured an electromagnet 98 constituting a holding coil for the piston, the operation of said coil being referred to hereinafter. This holding coil includes an iron core 100, bored to slidably receive switch operating means, and a winding 102 the latter being housed between the outer surface of the core and the inner surface of a cup-shaped housing member 104. The winding 102 is grounded to the casing of the motor unit by a conductor 106 and is connected by a conductor 108 to a conductor 110 mounted in the casing member 97 of the motor unit. When the holding coil 98 is energized, which is concurrent with the energization of a valve operating solenoid 116, Figure 13, a plate 111 fixedly secured to the piston 94 is attracted toward said holding coil. The conductor 110 is of course insulated from the casing member 97 and to said conductor there is connected a conductor 112 connected at its other end to the winding 114 of the valve operating solenoid 116. To a plate 118, constituting a part of the means for maintaining the holding coil in place, there is secured, by a screw 120, a cup-shaped plate 122 to which is detachably fastened an ignition interrupter switch 124. This switch includes a yieldable angular shaped metal clip 126 constituting the movable contact member of the switch and is secured to the plate 122 by means of a metal stud 128 constituting the fixed contact of the switch. The stud is insulated from the movable contact member and the plate 122 by suitable means such as washers 130, 132 and 134. To the stud or fixed contact of the switch 124 there is connected a wire 136 leading to a movable contact of the hereinafter described relay mechanism 50 and the movable contact 126 of the switch 124 is grounded by means of its contact with the plate 122 which is mounted on the member 118 secured to the casing member 97. The motor unit is conveniently detachably secured by a bracket 138 to the chassis of the vehicle which acts as a ground connection. As disclosed in Figure 5 the movable contact 126 of the ignition interrupter switch 124 is shaped to normally be out of contact with the fixed contact 128 of the switch and is forced into contact with the latter contact by means of a yieldable force transmitting means interposed between the motor piston 94 and said contact. This connecting means includes a cylindrically shaped metallic plunger 140 slidably mounted in the bored core 100 of the electromagnet holding coil 98 and to one end of the plunger there is secured a headed stem 142 slidable through an opening in the base of a cup-shaped plunger member 144. A spring 146 surrounding the stem 142 is interposed between one end face of the plunger member 140 and the base of the plunger member 144.

The three-way valve for controlling the operation of the motor unit 46 and the means for operating said valve are disclosed in Figure 13. Describing these elements there is provided a two-part solenoid and valve casing secured to the casing of the motor unit by a bracket 147. The upper part 148 of the two-part casing is cup-shaped and houses the solenoid winding 114 which is connected by a conductor 150 to a conductor 152 secured to said part of the casing and insulated therefrom. To the conductor 152 there is connected the aforementioned conductor 112 which is connected to the winding 102 of the holding coil 98. The latter member is electrically connected to a relay switch 310 which is in turn electrically connected to a grounded battery 400.

Figure 3:
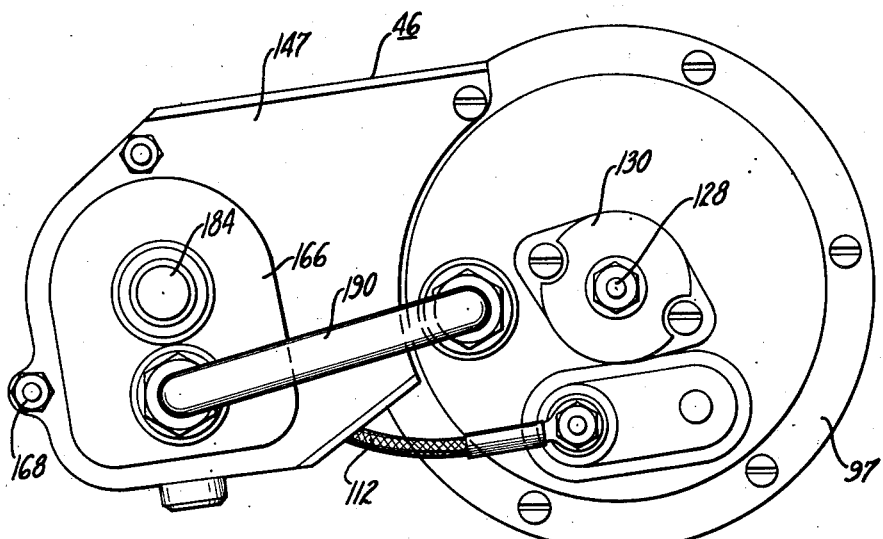
Figure 3 is an end view of the motor unit disclosed in Figure 2.

The lower part 166 of the two-part solenoid and valve casing is cup-shaped and is detachably secured to the upper part 148 of the casing by fastening means 168; and a valve plate 170, housed within the casing, is secured by the fastening means 168 to the casing parts. This plate 170 is cupped in its central portion and in the base of the cupped portion there is provided an opening outlined by a downwardly extending flange 172. This flange constitutes a seat for a valve member 174 secured to a stem 176 passing through the aforementioned opening in the valve plate and extending from the armature 178 of the solenoid 116. A spring 180, interposed between one end of the armature and a fitting 182 secured to the casing part 148, serves as a means for biasing the valve member 174 to the valve closed position disclosed in Figure 13. In this position of the valve member the same is seated on the upper end of a hollow fitting 184 secured to the lower casing member 166. A hollow fitting 186 secured to the casing member 148, provides a means for venting the interior of said member to the atmosphere and a hollow fitting 188 secured to the casing member 166 receives one end of a flexible conduit 190 connected at its other end to a hollow fitting 192 secured to the end plate 97 of the motor unit 46, all as disclosed in Figures 2 and 3. To the outer end of the fitting 184 there is secured a vacuum conduit 194, said conduit being connected at its other end to the intake manifold of the internal combustion engine of the vehicle.

Describing now the operation of the motor unit 46, its control valve 174 and the means for operating said valve when the solenoid 116 is energized, its armature 178 is moved upwardly thereby sealing the valve upon the flange 172 of the valve plate 170. The valve is thus opened and there results an energization of the motor unit by a differential of pressures acting upon the power element 94, for the opening of the valve effects a partial evacuation of a motor chamber 198 outlined by the piston or power element 94, the casing member 97 and a portion of the casing member 88. Air is drawn from said chamber 198 via the conduit 190, a chamber 200 outlined by the casing member 166 and valve plate 170, and the conduit 194 connected to the intake manifold. The right side of the piston 94 is, by virtue of the partial vacuum existing in the chamber 198, subject to a relatively low gaseous pressure and the left side of said piston is subject to the relatively high gaseous pressure exerted by the atmosphere, for a chamber 202, outlined by the piston 94 and a portion of the casing member 88, is permanently vented to the atmosphere via a hollow fitting 204 to which may be connected an air cleaner, not shown. An air cleaner may also be connected to the aforementioned fitting 186, Figure 13. Accordingly, the energization of the solenoid 116 results in an upshift operation of the motor unit 46, that is the parts of said unit take the positions disclosed in Figure 4, the rod 92 moving to the right thereby moving the crank 48 to its upshift position. Referring to Figure 4 it will be noted that by this upshift operation of the motor unit the ignition interrupter switch 124 is closed; for when the piston 94 is forced to the right, by the differential of pressures to which it is subjected, the yieldable force transmitting means, including the member 144, the spring 146 and the plunger 140, is operative to angularly move a part 206 of the movable contact 126 of the switch 124 to the right from the position disclosed in Figure 5 to that disclosed in Figure 4.

An important feature of my invention lies in the relative strength of the materials going to make up the spring 146 and the bendable contact member 126; for a greater force is required to collapse the spring 146 than is required to move the switch part 206 to its switch closed position disclosed in Figure 4. It follows therefore that when the aforementioned force transmitting means 140, 144 and 146 is subjected to the load of the rod 92 the switch part 206 will be angularly moved to close the switch 124 before the spring 146 is collapsed. In this operation the member 144 telescopes over the stem 142 from the position disclosed in Figure 5 to the position disclosed in Figure 4.

Completing the description of the operation of the motor unit when its parts assume the positions disclosed in Figure 4, it is to be remembered that the holding coil 98 is energized simultaneously with an energization of the solenoid 116; accordingly, when the piston 94 reaches the position disclosed in said figure it is held in said position not only because of the differential of pressures acting on said piston but also by virtue of the operation of the energized holding coil, for the plate 111 is then held firmly against the end of the core 100.

Describing now the kickdown operation of the motor unit 46 when the valve operating solenoid 116 and the holding coil 98 are deenergized there results an energization of the motor unit by virtue of the operation of a spring 208. This spring, which is interposed between the piston 94 and the casing member 97, is compressed or cocked, to become a source of potential energy, when the piston 94 is moved to its upshift position disclosed in Figure 4. When the solenoid 116 is deenergized the spring 180, Figure 13, expands thereby moving the valve member 194 to the position disclosed in said figure. The chamber 198 of the motor unit is by this operation vented to the atmosphere via the hollow fitting 186, a chamber 210 outlined by a portion of the casing member 148 and the valve plate 170, the opening in said plate, chamber 200, and conduit 190.

The piston 94 is then no longer subject to the force resulting from a differential of gaseous pressures acting upon the same and is free to be moved to the left, to the position disclosed in Figure 5, by the expansion of the spring 208; and this operation of course effects a rotation of the transmission operating crank, not shown, to establish the transmission in its kickdown setting.

Now it is an important feature of my invention that during the first part of this kickdown movement of the piston 94, that is when the slack in the system is being taken up, the aforementioned drive control elements of the transmission are being moved out of engagement with each other and the synchronizing mechanism of the transmission is operating, the switch 124 is not opened; for it is to be noted, as is evident from the description of the mechanism given above, that before said switch may open the spring 146 must expand, while the rod 92 is in contact with the member 144, until the parts of the force transmitting means are in the position disclosed in Figure 5. Accordingly, the relative strengths of the spring 146 and the contact member 126 and the construction and arrangement of the cooperating parts are preferably such that when the kickdown operation of the motor unit is taking place, the piston 94 moves a short distance and the spring 146 at the same time expands, before the switch 124 is opened. The purpose of this particular timing of the opening of the switch 124 will be brought out hereinafter when the complete operation of my invention is described.

Describing now the governor 66 and breaker switch 64 operated thereby, disclosed in detail in Figures 6, 7 and 8, this mechanism, hereinafter referred to as a governor and switch unit, includes a cup-shaped casing member 212 having an opening 213 in its base. A drive shaft housing member 214 is secured at its upper end to said casing member, a portion of said member extending through the opening 213. The member 214 may be threaded at 216 to provide means for securing the governor and switch unit to the chassis or any other convenient support. The member 214 is bored to receive a governor drive shaft 218 having a gear member 220 secured to its lower end by a pin 222. The drive shaft 218 is journalled in bearings 224 and 226 which are grooved at 228 to receive a lubricant. To the upper end of the drive shaft there is secured a pin 230 telescoped within a cup-shaped member 232. The lower end of the member 232 is provided with an outwardly extending flange 234 having portions thereof fitting within notches 236 and 238 in centrifugally operated weights 240 and 242 respectively, said weights being mounted on pins 244 and 246. These pins are secured at their ends to a stamping 248 U-shaped in cross section secured to the end of the driving shaft 218. A relatively thin plate 250 is fixedly mounted on the top of the housing member 214 and felt 252 or any other suitable air filter material is packed between the plate 250 and the bottom of the casing member 212. This filter is incorporated in the governor and switch unit for the purpose of cleaning the air which is drawn in via an opening 254 in the base of the casing member 212 into said casing. The filter absorbs any water which is admitted to the interior of the casing via the opening 252; for the operation of the centrifugal weights results in a partial vacuum being created within the unit and as a result air, water and dirt are drawn through the opening 252.

Describing now the breaker switch mechanism disclosed in Figures 6, 7, and 8, the same is mounted on the inner side of a cover plate 256 of the governor and switch unit which plate is detachably secured, by fastening means 258, to the cup-shaped casing member 212. The switch mechanism comprises a thin, flat U-shaped metal stamping 260, Figure 7, constituting the movable contact member of the switch and a metal bolt 262 constituting the fixed contact member of the switch. The movable contact which operates as a lever is provided with a metal tab 263 extending inwardly from one end portion of the stamping, said end portion being enlarged at 264 as clearly disclosed in Figure 7. The fixed contact 262 is insulated from its support by any suitable means 266 and is so provided with a metal tab 268 contactible by the tab 263. The U-shaped movable contact is provided with openings 268 and 270 and through these openings extend fulcrum members 272 and 274. The latter members are preferably rectangular in shape and slightly bent at their ends, thereby providing a fulcrum for the contact member 260 when said member is forced against the members 272 and 274 as it is being rocked to open and close the switch. The members 272 and 274 constitute an integral part of a stamping 276 which may be riveted to the inner surface of the casing member 256.

Describing the means for effecting the rocking action of the movable contact member, that is, the operation of said member when it functions as a lever, there is provided a coiled tension spring 278 having a hook 280 at one of its ends extending through an opening in a central part 281 of the U-portion of said contact member. The other end of the spring 278 is provided with a hook 282 which extends through an opening in one end of a rectangular shaped metal stamping 284. This stamping is preferably provided with a rectangular shaped opening 288 in its other end through which opening there extends a rectangular shaped support member 290. As with the aforementioned fulcrum members 272 and 274 the member 290 is an integral part of the stamping 286 and is slightly bent at its upper end to provide a groove to support the end of the stamping. The central portion of the stamping 286 is provided with an opening through which extends the shank portion of a yieldable member 292 made of any suitable non-conductive material such as synthetic rubber. One end of this member 292 is preferably rounded as disclosed in Figures 6 and 8 and is contacted by the aforementioned cup shaped member 232. A coiled compression spring 294 is sleeved, at one of its ends, over the shank of the member 292 and at its other end is fitted within a screw 296 bored to receive said spring. This screw is threaded into a cylindrically shaped member 298 fixedly secured to the casing member 256 by means of a cylindrical portion 300 extending through an opening in the casing member 256 and bent over at its end to provide means not only to clamp the member 298 in place but also to secure the stamping 276 in place.

Describing now the operation of the governor and the breaker switch operated thereby, it will be noted as disclosed in Figure 8, that when the tension spring 278 extends in a line forming an acute angle A with the plane of the U-shaped movable contact member 260, then said spring exerts a force having a component which lifts the end portion of said contact member upwardly, that is, away from the plane of the casing member 256. This condition results in the holding of the contact tabs 263 and 268 in engagement with each other to maintain the switch closed, and the switch remains closed when the car is at a standstill or is traveling below the higher of two critical governor speeds, say thirteen miles per hour, as the speed of the vehicle is being increased. Until this critical speed is reached the governor mechanism does not force the cup shaped member 232 upwardly far enough to move the member 292 and the stamping 286 connected thereto. To effect a closing of the switch the compression spring 294 forces the movable end of the stamping 286 downwardly to the position disclosed in Figure 8 in which position the contact member 260 and spring 278 are out of alinement with each other as disclosed by the angle A in said figure.

When the vehicle speed is being increased and is approaching the aforementioned critical upshift speed of 13 M. P. H., the governor weights 240 and 242 rotate about the pins 244 and 246 in the direction of the arrows shown in Figure 6 thereby forcing the member 232 upwardly to compress the spring 294 and move the spring 278 into alinement with the movable contact member 260. When the aforementioned critical vehicle speed is attained spring 278 is positioned very slightly beyond dead center with respect to the contact member 260; then the longitudinal axis of said spring lies in a plane forming a very small acute angle with the plane of said contact member. The spring then exerts a force having a component tending to pull the portion 281 of the contact member toward the plane of the casing member 256. The contact member acting as a lever is by this operation rocked with a snap action about its fulcrum to open the switch. Upon decreasing the vehicle speed to the critical downshift speed of, say 10 M. P. H., the force exerted by the centrifugal weight driven member 232 is reduced and the spring 294 expands, returning the spring 278 and stamping 286 to their positions shown in Figure 8; and this results in the rocking of the movable contact member about its fulcrum to again close the switch. It is to be noted that due to static friction and other causes, there is a differential of approximately 3 M. P. H. in the aforementioned critical governor speeds; however, this is a desirable feature of the switch mechanism of my invention, inasmuch as such a mechanism is free of the undesirable hunting operation of a breaker switch. By adjusting the setting of the screw 296 with the consequent variation of the loading of the compression spring 294 the critical governor speeds may be varied as desired. To make this adjustment it is necessary to remove a protective packing 297 of wax or other suitable material.

Continuing the description of the operation of the friction clutch and transmission operating and ignition controlling mechanism diagrammatically disclosed in Figure 1 with the car at a standstill and the engine idling the clutch is disengaged by the power means described hereinafter. A manually operated shift lever, not shown, conveniently positioned near the steering wheel of the vehicle, is then actuated to establish the transmission in a low gear setting. The accelerator 16 is then depressed as the clutch is engaged and the car is gotten under way. In this operation if the power plant includes a fluid coupling then said coupling cooperates with the friction clutch 33 to effect a smooth start of the vehicle.

Now, it is to be remembered as previously described that when the car is at a standstill or is traveling below a certain speed the governor operated breaker switch 64 is closed as is disclosed in Figures 1 and 6; and when said switch is closed an electrical circuit is completed through the relay 50. This circuit includes the grounded switch 64, and an electromagnet 308 electrically connected to the grounded battery 400. The electromagnet 308 is thus energized thereby opening the relay switch 310 to break the electrical circuit from the battery to the valve operating solenoid 116 and the holding coil 98. The solenoid and holding coil are accordingly deenergized resulting in a positioning of the power element 94 of the motor unit in the downshift position disclosed in Figure 5, all as previously described.

It follows therefore that the transmission remains established in its downshift setting until the speed of the vehicle is increased to the governor speed which may be 13 M. P. H. As stated above, this critical governor speed may be changed at will by adjusting the screw 296, Figure 6. When this critical speed is reached the governor operating switch 64 is opened, thereby breaking the electrical connection between said switch and the relay electromagnet 308; the latter is then deenergized resulting in the closing the switch 310. The holding coil 98 is then energized to later perform its function and the solenoid 116 is energized to open the three-way valve mechanism, Figure 13, controlling the motor unit. The chamber 198 of the motor unit is thus connected with the intake manifold and when the gaseous pressure, or in other words, degree of vacuum of said manifold, reaches a certain factor then the motor unit will be energized, as previously described, to establish the transmission in its upshift setting. This gaseous pressure is effected by releasing the accelerator and this is done by the driver when the desired speed of the vehicle in the kickdown setting of the transmission has been attained. It is not necessary, however, to completely release the accelerator to effect this result. Now when the power element 94 of the then energized motor unit reaches its upshift position disclosed in Figure 4 the energized holding coil 98 maintains said power element in this position until the hereinafter described kickdown operation of the motor unit is effected; for when the air gap between the plate 111 and the end of the holding coil is relatively small, that is, after the demeshing operation of the transmission has been completed, the holding coil exerts an appreciable magnetic pull to draw the plate 111 into contact with said end of the coil. The function of the holding coil now becomes apparent, for when the driver, desiring to either speed up the vehicle or to maintain its speed, again depresses the accelerator short of a position to close the switch 31 the gaseous pressure in the manifold and chamber 198 connected thereto is increased. The then energized holding coil, however, serves to maintain power element 94 in its upshift position. It is assumed of course that the car speed is at the time maintained sufficiently high to prevent the closing of the switch 64.

The motor unit 46 is thus automatically operative to establish the transmission in its upshift setting when the accelerator is released far enough to make possible an operation of said unit by vacuum and the car speed is at the time at or above the higher of the two governor speeds; and the transmission, by virtue of the operation of the holding coil, remains in this upshift setting despite a subsequent depression of the accelerator to maintain or increase the speed of the vehicle.

Completing the description of the mechanism disclosed in Figure 1 there is provided by this mechanism power means for establishing the transmission in either its upshift or kickdown settings and for operating the friction clutch and controlling the ignition system to facilitate the operation of the transmission to effect its kickdown setting. The clutch operating power means, described hereinafter, serves to facilitate the kickdown operation of the transmission when the vehicle is being brought to a stop; and a momentary disabling of the ignition system serves to facilitate this kickdown operation when the accelerator is depressed to close the switch 31.

As disclosed in Figure 1 the above described transmission operating and ignition controlling motor unit 46 is controlled by the aforementioned relay mechanism 50 which includes two separate relays 304 and 306. The relay 304, comprising an electromagnet 308 and a breaker switch 310, serves to control the operation of the valve operating solenoid 116 and the holding coil 98 of the motor unit; and the relay 306, comprising an electromagnet 312 and a breaker switch 314, cooperates with the ignition interrupter switch 124 to provide means for momentarily disabling the ignition system when and only when the kickdown operation of the transmission is initiated by depressing the accelerator to its full open position. The electromagnet 308 of the relay 304 is controlled by either the above described governor operated switch 64, Figure 6, or by the accelerator operated three-pole switch mechanism 31 and the aforementioned grounded limit switch 67. The latter switch, or its equivalent operative as a function of the speed of the engine, includes a flat plate 317 of relatively large area pivotally mounted at 318 or some convenient part of the engine where it will receive the current of air from the engine cooling fan but will not be materially affected by the air passing through the radiator grill. The force exerted by this current of air will therefore be substantially directly proportional to the speed of rotation of the fan and therefore substantially directly proportional to the R. P. M. of the engine. To one side of the plate 317 there is secured the movable contact 320 of the wind switch and said contact, when the switch is closed, abuts a fixed contact 322 of the switch secured to some part of the engine or any other convenient support 324. Describing the operation of this switch, at a relatively high speed of the engine, say 2500 R. P. M. the plate 317 is subjected to a force exerted by the current of air generated by the cooling fan and this force is of sufficient magnitude to move the plate clockwise against the tension of a spring 326 to close the switch. It follows of course that when the speed of the engine drops below 2500 R. P. M. the spring 326 functions to open the switch 317.

Describing now that part of the power means of Figure 1 operative to control the engagement and disengagement of the friction clutch 38, there is provided a single acting pressure differential operated motor unit 328, Figures 1 and 9 to 12 inclusive, the power element 330 of which is operatively connected by a rod 332 to a lever 334 connected by a rod 336 to the driven plate 42 of the friction clutch 38. The clutch operating motor 328 is controlled by valvular mechanism, disclosed in detail in Figures 13 and 14, including a three-way valve mechanism 338, operative to initiate the clutch disengaging and clutch engaging operations of the motor, a first stage bleed valve 340, automatically operative, when the clutch plates contact at a predetermined load, to terminate a relatively fast clutch engaging movement of the motor power element 330 and a second stage bleed valve 342, Figures 14 and 15, operated by the accelerator and operative to control the loading of the clutch plates as said plates are moved, by a clutch spring 344, into firm engagement with each other.

Describing now in detail the clutch control motor unit 328 disclosed in Figures 9 to 12 inclusive, the motor part thereof, disclosed in section in Figure 11, includes cup shaped casing members 331 and 333 each provided with a flange and between said flanges there is detachably secured by fastening means 335, a flexible portion of the power element 330 of said motor. The motor unit is preferably detachably secured, by studs 337, to some part of the chassis of the vehicle or other convenient support located near the clutch operating crank 334.

The aforementioned three-way valve and first stage valve, together with the means for operating said valves, is detachably secured as a unit to the casing member 333 by a stud 339 extending into a body member 341 of said unit. This unit includes a cup shaped casing member 343 detachably secured, by studs 345, to the body member 341 and also includes cup shaped casing members 347 and 349 together constituting a housing for the first stage valve 349 and the power means for operating said valve. The casing members 347 and 349 are each provided with a flange and between said flanges there is secured, by studs 351, a flexible diaphragm 353 constituting the power element of the power means for operating the valve 349. To the central part of the diaphragm 353 there is secured a hub member 355 which is recessed to receive a valve member 357 constituting the most important element of the first stage valve mechanism 349. The diaphragm 353 is biased, to the valve closed position disclosed in Figure 11, by a spring 359, one end of said spring being sleeved over a pin 361 extending through the center of the diaphragm 353 into hub member 355 and secured thereto. The other end of the spring 359 extends within the interior of a cup shaped member 363 fixedly secured to the central part of the casing member 347. A stud 365, having an enlarged end portion 367 abutting the spring 359, is threadedly mounted in the base portion of the member 363.

Describing now the valve mechanism 338 and the means for operating the same the casing member 343 constitutes a housing for a valve operating solenoid 369 comprising a winding 371 and an armature 373 to the lower end of which is secured a valve member 375. A disk shaped member 377 is detachably secured, by the studs 345, to the body member 341 and the casing member 343 and said member 377 is cupped in its central portion.

The valve operating solenoid 369 is electrically connected in series with the grounded battery 499, a clutch pedal operated breaker switch 379, the accelerator operated breaker switch 34, Figures 14 and 15, and the grounded governor operated breaker switch 64. When these three switches are closed, that is, when the accelerator is released, the vehicle is at a standstill or is travelling at or below governor speed, and the clutch pedal is released, the valve operating solenoid 369 is energized to initiate a clutch disengaging operation of the motor unit 328. As the clutch pedal is being moved to its clutch disengaged position the switch 379 is preferably opened at the cushion point of the clutch plates, that is the position of the movable driven clutch plate when it is in slight contact with the driving clutch plate; and this operation renders the clutch control mechanism inoperative until such time as the clutch pedal is returned to its clutch engaged position.

Explaining the function of the switch 379, when the engine is dead and the car is at a standstill it is best to manually disengage the friction clutch 38 prior to cranking the engine; for regardless of whether or not the transmission 44 is in neutral and regardless of the operation of the fluid clutch if the vehicle includes this mechanism it is always best, to avoid a possible stalling of the engine, to unload the engine as much as possible. If, perchance the transmission is in gear, then it is quite necessary to manually disengage the friction clutch before cranking the engine. This desirable unloading of the engine is of course accomplished by disengaging the friction clutch and this must be done by depressing the clutch pedal 201. This operation is necessary for the reason that at this time, that is, before the engine is started there is no source of vacuum to energize the clutch operating motor 328. Now if perchance the driver is a little slow in moving the clutch pedal to its clutch disengaged position, that is, the position of the pedal necessary to effect the same separation of the clutch plates as is effected by a clutch disengaging operation of the motor unit 328, and if, during this movement, there is created a source of vacuum in the intake manifold by a starting of the engine, then the clutch motor unit will be energized before the clutch disengaging movement of the clutch pedal is completed; and this results in a sudden reduction of the force necessary to complete the disengagement of the clutch or, expressed in other words, a lightening of the clutch pedal. This is of course an undesirable effect and will probably result in the clutch pedal being slammed against the floorboard. The incorporation of the switch 379 in the means for controlling the clutch control valve 338 prevents this undesirable result.

Referring now to Figures 14 and 15 there is here disclosed the second stage bleed valve 342, the switch 34, Figure 1, and the accelerator operated means for operating said valve and switch. This mechanism includes a casing 381 hollowed out in the upper part thereof to receive the switch 34, the valve 342 and the means for operating the switch and valve. To the under side of a cover member 383, which is made of a non-conductive material, there is secured a U-shaped metallic member 385 serving as a support for a movable contact member 387 pivotally mounted on a pin 389 extending through said support and arms 391 and 393 of the movable contact member. A clip 465, mounted on the top of the cover member 383, is secured to the member 385 and to this clip there is attached the conductor connected with the winding 371 of the solenoid 369. This movable contact member includes a U-shaped member 395, a contact member 397 secured to the member 395 and abutting a fixed contact member 399 when the switch is closed, a rectangular shaped filler member 401 and the aforementioned arms 391 and 393. A prong 403 of a coil spring 405, sleeved over the pin 389, lies upon the top of the filler member 401 fitted within the U-shaped member 395, said prong serving to bias the movable contact member to its switch closed position. To the under side of the cover member 383 and by the side of the movable contact member there is secured a stamping 407, said stamping being provided at one of its ends with a laterally extending projection 409 to which is secured the fixed contact member 399. A clip 467, mounted on the top of the cover member 383, is secured to the stamping 407 and to this clip there is attached the conductor, Figure 1, connected with one of the contacts, preferably the fixed contact of the clutch pedal operated breaker switch 379. Through an opening in the cover member 383 and an opening in that portion of the stamping 407 adjacent the projection 409 there extends a bolt 411.

Upon the end portion of this bolt extending through the stamping 407 there is threaded a nut 413 and a spring 415 is interposed between the under side of the cover member 383 and the top side of said stamping. A lock nut 417 may be threaded on the bolt, said nut contacting the top of a spool shaped bushing 419 mounted in the cover member 383 and provided with a bore which is threaded to receive said bolt. The bolt 411 therefore provides a means for determining the degree of gap between the fixed and movable contacts 399 and 397 when the switch is opened; for either a rotation of the bolt or a rotation of the nut 414 upon the bolt will serve to either compress the spring 415 or permit the same to expand, thereby changing the distance between the contacts 397 and 399 when in their switch open position.

Describing now the valve mechanism of the unit disclosed in Figures 14 and 15, the same comprises an irregular shaped valve support plate 421 extending crosswise of the unit and pivotally mounted upon a pin 423, the ends of which extend through the sides of the body member 381. One side of the plate 421 is turned up at 425 to provide an ear through which the pin 423 extends and the other side of said plate is turned up to provide the base portion of an arm 427 provided at its end with a laterally extending portion 429, Figure 15. The aforementioned valve member 342 is fixedly secured to the plate 421 and in its valve closed position contacts an annular portion 431 of the body member 381 constituting a valve seat. The valve plate 421 is held in its valve closed position by a valve spring 451. Both the valve member 342 and switch 34 are opened by a cam 437 pivotally mounted at its ends in the side walls of the body member 381 and shaped to provide flats 439 and 441 lying in different planes. A crank 443 is secured to a pin 445 extending from one end of the cam, said crank being connected to the accelerator 16 by the link 19, Figure 1.

Describing now the operation of the switch and valve unit, when the accelerator is in its released position the cam is moved, by an accelerator return spring 447, to its switch and valve closed position disclosed in Figures 14 and 15. As disclosed in Figure 15 the portion 429 of the arm 427 is then spaced a short distance from the flat 441 of the cam. The plate 421 is at this time held in its valve closed position by the spring 451 and the movable contact member is held in its switch closed position by the spring 405. The switch 34 being closed, the clutch control mechanism then functions to disengage the friction clutch providing of course the engine is idling to create a source of vacuum, the governor operated switch 64 is closed and the clutch pedal 201 is released to close the switch 379. To reengage the friction clutch below governor speed the driver then depresses the accelerator to open the switch 34 and open the valve 342.

Describing this operation of the switch and valve unit, when the accelerator is depressed the crank 443, which is directly connected to the accelerator by the link 19, is rotated clockwise, Figure 14, thereby rotating the cam 437. Now, inasmuch as one edge of the flat 439 is in contact with the bottom of the member 401 it follows that the clockwise rotation of the cam serves to rotate the contact member 387 in a counter-clockwise direction, thereby opening the switch 34. The opening of the switch 34 results in a deenergization of the solenoid 369, thereby permitting a spring 453 to move the armature 373 downwardly to the position disclosed in Figures 11 and 12. The valve member 375, which is connected to the armature 373, is thus moved to its valve closed position disclosed in Figures 11 and 12 and this operation of the valve initiates a clutch engaging operation of the motor unit 328 which operation is described hereinafter.

By continuing the depression of the accelerator the cam 437 is rotated sufficiently to take up the lost motion between the flat 441 and the member 429, Figure 15, and further depression of the accelerator results in a rotation of the cam, and a rotation of the arm 427 and plate 421, to open the second stage bleed valve member 342. The opening of this valve member results in a venting to the atmosphere of a compartment 455 of the clutch control motor unit. The air travels to said compartment via openings 457 in a plate 459 constituting the base of the valve and switch unit, compartments 461 and 463 in said unit which compartments may be filled with steel wool or other suitable air cleaning material, ports 469 and 471 in the body member 381, a compartment 473 of the unit which houses the above described switch and valve mechanism, a duct 475, a duct 477 and a conduit 479 connected with the motor unit.

There is thus provided in the switch and valve unit disclosed in Figures 1, 14 and 15 an accelerator operated means for in part controlling the operation of the clutch operating motor unit 328; for, assuming that the switches 379 and 64 are closed and the engine idling, a release of the accelerator serves to effect a closing of the switch 34, thereby initiating a clutch disengaging operation of the motor unit. When the accelerator is depressed to open the throttle the first increment of movement of the accelerator results in an opening of the switch 34 to initiate a clutch engaging operation of the motor unit. As will be described in greater detail hereinafter, the first stage of this clutch engaging operation is automatically completed when the clutch plates contact with each other at a predetermined load and the second stage of this clutch engaging operation and opening of the throttle are, with a normal operation of the accelerator, initiated when the accelerator has been depressed far enough to initiate the movement of the link 18, Figure 1, that is, after the lost motion between the end of the link and one end of the slot in the connection 33 has been taken up.

Describing now the complete operation of the clutch control mechanism disclosed in Figures 1, 14, 15 and 9 to 12 inclusive and incidentally completing the description of said mechanism, when the accelerator 16 is completely released to close the switch 34, the clutch pedal 201 is in its released position to close the switch 379 and the vehicle is either at a standstill or is traveling at or below the critical governor speed to thereby effect a closing of the switch 64, then the valve operating solenoid 369 is energized. This operation results in the armature 373 being drawn upwardly, against the tension of the spring 453 to seat the valve member 375 at 481, Figures 11 and 12. The clutch control motor unit 328 is then energized; for a compartment 483 of said unit is permanently vented to the atmosphere via a port 485 in the casing member 331 and the compartment 455 of said unit is at this time connected with the intake manifold of the engine via ducts 487 and 489, Figure 12, in the casing member 341 a valve compartment 491 outlined by the member 377 and the upper surface of the body member 341, ducts 493 and 495, Figure 11, in the casing member 341, a nipple 497 fitted within the duct 495 and a flexible conduit 499 connected with the intake manifold of the engine. The diaphragm 330 of the motor unit is thus subjected to a differential of pressures resulting in its movement to the dotted line position disclosed in Figure 9 in which position the friction clutch 38 is disengaged, that is the driven clutch plate 42 is moved away from the driving clutch plate 36 against the tension of the clutch spring 344, Figure 1.

Describing now the clutch engaging operation of the motor unit 328, when the electrical circuit including the solenoid winding 371 is broken by the opening of any one of the switches 379, 64 or 34, then the solenoid 369 is deenergized. The spring 453 acting on the solenoid armature 373 then expands, thereby moving said armature and the valve member 375 connected thereto downwardly to seat said valve member at 501, Figure 12. This closing operation of the valve member 375 results in a venting of the compartment 455 of the motor unit to the atmosphere via a hollow nipple 503, Figure 10, mounted in the valve casing member 349, a compartment 505 outlined by the diaphragm 353 and said casing member 349, ducts 507 and 509 in the body member 341, a compartment 511 outlined in part by the members 377 and 343, the aforementioned compartment 491 and the aforementioned ducts 489 and 487, the latter leading to the motor compartment 455.

As will be described hereinafter this air transmitting circuit is made possible by virtue of the fact that the valve operating diaphragm 353 is moved to the left, to move the valve member 357 away from a seat 513, when the motor unit is energized; for when said unit is energized a compartment 515 of said unit is partially evacuated by virtue of a conduit 517 which is connected with the compartment 455 of the unit. It follows therefore that when the compartment 455 is partially evacuated the compartment 515 is to the same degree evacuated and this results in the aforementioned movement of the diaphragm 353, and the valve 357 connected thereto, to the left to unseat said valve. The compartment 505 is at all times vented to the atmosphere by the hollow nipple 503; accordingly, when the compartment 515 is partially evacuated the diaphragm 353 is subjected to a differential of pressures resulting in the aforementioned movement of said diaphragm.

The most important feature of the clutch control mechanism of my invention lies in the means for controlling the clutch engaging operation of said mechanism and completing the description of this operation, as stated above, the valve 338 is at this time, that is immediately after the solenoid 369 is deenergized, closed by the seating of valve member 375 on the seat 501, and the valve member 357 is positioned away from the seat 513.

Figure 9:
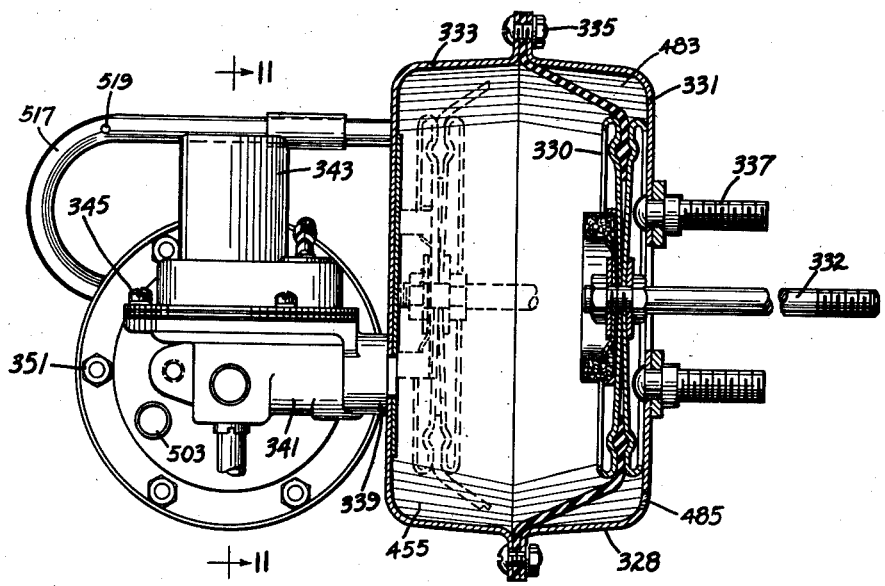
Figure 9 is a view of the clutch control motor and valve unit of that embodiment of my invention disclosed in Figure 1, the valve mechanism being shown in end elevation and the motor being shown in longitudinal section.
Figure 10:
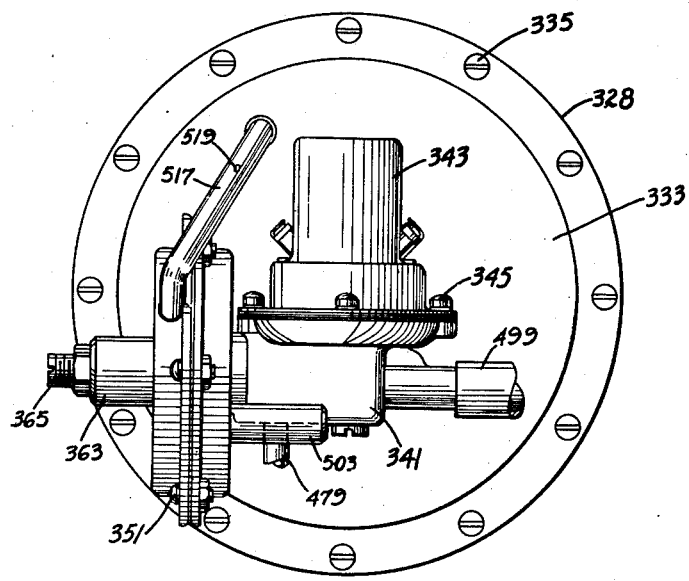
Figure 10 is an end elevational view of the motor and valve unit of Figure 9.

Air then rushes into the motor compartment 455 from the nipple 503 via the above described air transmitting circuit and this action results in the initiation of a movement of the diaphragm 330 to the right, Figure 9, toward its clutch engaged position shown in full lines in said figure, the clutch spring 344 then functioning as a source of power. This operation immediately results in the maintenance of a partial vacuum in the motor compartments 455 and 515, and the maintenance of the diaphragm 353 and the first stage valve member 357 connected thereto in their valve open positions; and the valve member 357 remains in this open position as long as the clutch spring is with full force pulling the diaphragm 330 to the right, Figure 9, to thereby maintain the partial evacuation of the compartments 455 and 515.

Now when the clutch plates contact at a certain load the pulling force of the clutch spring 344 is reduced and this operation results in a seating of the valve member 357.

Explaining this operation of the mechanism, it is to be remembered that the compartments 455 and 515 are at the time vented to the atmosphere; accordingly, when the vacuum creating movement of the piston 330 is checked by the contacting of the clutch plates, the air continues to rush into said compartments with the result that the spring 359 then functions to seat the valve member 357 and cut off the flow of air into said compartments. At this juncture it is to be observed that the time of closing of the valve 357 and the degree of loading of the clutch plates when the movement of the piston 330 is checked, is determined by the loading of the spring 359; accordingly, the initial loading of the clutch plates and the resultant initial acceleration of the vehicle is determined by the adjustment of the screw 365.

Now all of the above described clutch engaging operations of the parts of the motor unit to effect the first stage of clutch engaging movement of the power element are, with a normal operation of the accelerator, completed before the accelerator is depressed sufficiently to open the throttle and the bleed valve 342; for as previously described the first increment of movement of the accelerator effects an opening of the switch 34 and this operation initiates the aforementioned first stage operation of the motor unit. Continued depression of the accelerator opens the throttle thereby increasing the torque of the engine and the resultant driving force of the clutch plate 36, and this operation of the accelerator also opens the bleed valve 342 thereby providing the heretofore described supplementary source of air for the compartment 455 of the motor unit. Now the degree of opening of the bleed valve 342 determines the rate of flow of air into the compartment 455 with the resultant progressive increase of the clutch plate loading. There is thus provided in the accelerator operated bleed valve, means cooperating with the throttle for determining the rate of increase of the acceleration of the vehicle, said rate of increase being determined by the mode of operation of the accelerator as the same is depressed. The conduit 517 may be provided with a small bleed opening 519, thereby providing a source of air for the motor compartment 455 which supplements the air to said compartment admitted via the second stage bleed valve 342. If perchance the driver merely depresses the accelerator only a slight distance to open the bleed valve 342, then the air admitted to the compartment 455 via the opening 519 will result in an increase in loading of the clutch plates and thereby prevent a slipping of the clutch.

It is to be noted here that by constructing the mechanism of Figure 1 so that with a normal operation of the accelerator the opening of the throttle and bleed valve is timed to occur at the time when or immediately after the clutch plates first contact with each other, there is provided a mechanism which cooperates well with the fluid clutch to effect a smooth start of the vehicle from rest or a speeding up of the vehicle when the friction clutch of the mechanism of Figure 1 is reengaged by depressing the accelerator; for the fluid clutch, by virtue of its being a yieldable force transmitting medium, will prevent the engine from being stalled both before and after the second stage bleed valve is opened. If, perchance the first stage bleed valve fails to close at the proper time or fails to close at all, then the fluid clutch will, by virtue of a slipping action, prevent a stalling of the engine; and if the driver after a slight opening of the bleed valve 342 fails to continue the depression of the accelerator to increase the engine torque, then the fluid clutch will again prevent the engine from stalling. If the clutch control motor unit is provided with the fixed bleed opening 519 and the driver fails to open the bleed valve 342 then the fluid clutch will prevent the engine from stalling as the clutch plate loading is increased.

There is thus provided, in the clutch control mechanism of that embodiment of my invention disclosed in Figure 1, means cooperating with both the fluid clutch and the transmission operating and ignition controlling motor unit 46 to insure the desired acceleration of the vehicle after a kickdown operation of the transmission.

Describing now the complete operation of the embodiment of my invention disclosed in Figure 1 and incidentally completing the description of the several parts of this mechanism, when the vehicle is at a standstill or coasting to a stop and is below a relatively low vehicle speed, say 10 M. P. H., the parts of the mechanism are in the position disclosed in said figure. In this position of the parts the governor operating switch 64 is closed and the accelerator 16 is of course completed released. The friction clutch is accordingly disengaged by the clutch operating motor unit 328 which, as previously described, is energized when the valve 338 is opened.

Now when the grounded switch 64 is closed the electromagnet 308 of the relay mechanism 304 is energized and an electrical circuit is completed via said switch 64, a conductor 380, the electromagnet 308, conductors 382, 384, 386, 388 and 390, a fuse 392, a conductor 394, the ignition switch 396 of the ignition system, conductor 398 and the grounded battery 400.

The energization of the electromagnet 308 results in an opening of the switch 310 with the resultant opening of the electrical circuit interconnecting the grounded battery 400 and the grounded holding coil 98, said circuit including the conductor 398, the ignition switch 396, the conductor 394, the fuse 392, conductors 390, 388, 386 and 384, conductors 402 and 404, switch 310, conductors 406, 408, 410 and 154, valve operating solenoid 116, conductor 112 and the holding coil 98; and when this circuit is open the solenoid 116 and the holding coil 98 are deenergized, the transmission is established in its kickdown setting and the ignition interrupter switch 124 is opened, all as previously described.

As stated above, the accelerator is at this time released; accordingly the switch 31 is open, and when the switch 31 is open the electromagnet 312 of the relay 306 is deenergized resulting in the expansion of a spring 412 to open the breaker switch 314 of said relay. This switch 314 constitutes a part of the electrical means interconecting the grounded ignition interrupter 124 of the motor unit 46 and the primary winding of the ignition coil 52 of the engine controlling ignition system. This electrical means also includes the conductor 136, conductors 418 and 420 and conductors 422 and 424, the latter being connected with the primary winding of the ignition coil. It follows therefore that when the vehicle is coasting to a stop with the accelerator released to close the switch 34 and open the switch 31, the clutch is disengaged to reverse the engine torque and thereby facilitate the kickdown operation of the motor unit 46, the latter operation being automatically effected when the speed of the vehicle reaches the critical speed of the governor, say 10 M. P. H. It is to be noted that in this operation of the mechanism disclosed in Figure 1 there is no disabling operation of the ignition system, for the relay switch 314 is at the time open; accordingly, the primary winding of the ignition coil may not be grounded.

It will be assumed now that the vehicle is at a standstill with the engine idling, the clutch being then disengaged and the transmission being then established in its kickdown setting, and that the driver then wishes to start the vehicle in motion. If the vehicle is perchance mired in the mud the driver will then manually operate the transmission by moving the selector lever positioned beneath the steering wheel to its low gear position. The transmission having been established in this low gear setting by an operation of the shift lever and the crank 48 having been actuated by the motor unit 46 to establish the transmission in its kickdown setting, it follows that all operations are completed preparatory to getting the vehicle under way. The driver then depresses the accelerator, thereby effecting a controlled engagement of the friction clutch by the operation of the motor 328 and the vehicle gets under way slowly and smoothly. It is to be particularly noted that the fluid coupling of the car cooperates with the two stage clutch engaging operation of the motor unit 328 in effecting a smooth start, that is, relatively low acceleration of the vehicle. It is also to be noted, as set forth above, that the fluid coupling may be omitted from the power plant in which case the friction clutch control mechanism will of itself suffice to effect a relatively smooth start of the vehicle.

After the vehicle is under way above governor speed the driver will probably desire a higher gear ratio setting of the transmission; accordingly, he will move the shift lever to establish this setting. The accelerator will be released to reverse the engine torque prior to so operating the transmission and this operation, in cooperation with the fluid coupling, facilitates the necessary demeshing operation of the transmission. Explaining this reversal of the engine torque the release of the accelerator effects an idling operation of the internal combustion engine, that is, said engine is at the time not serving as a prime mover to drive the aforementioned movable drive control element of the transmission; and as previously described the release of the accelerator to idle the engine and open the switch 31 also serves to energize the motor unit 46 to establish the transmission in its upshift gear ratio setting. Describing this operation of the mechanism of Figure 1 when the vehicle is traveling at the higher of the two governor speeds, say 13 M. P. H., the switch 64 is opened, thereby deenergizing the relay electromagnet 308. A spring 426, interposed between one end of the electromagnet 308 and the movable contact 428 of the switch 310, then expands, closing said switch and thereby completing the electrical circuit through the solenoid 116 and holding coil 98 of the motor unit. In the manner previously described the motor unit is then energized by vacuum to effect the upshift setting of the transmission and the closing of the ignition interrupter switch 124.

The upshift operation of the transmission having been effected the drive will then again depress the accelerator to increase or maintain the speed of the vehicle. It will be assumed now that the internal combustion engine is operating at a speed below that necessary to open the wind switch 317 and that the driver desires to effect a knickdown operation of the transmission to thereby make it possible to quickly pass another vehicle on the road. To effect this operation of the transmission all that the driver need do is to depress the accelerator all the way down, that is, far enough to close the switch 31. This operation effects a closing of the electrical circuits to energize both the electromagnets 308 and 312 of the relay mechanism 302; for as disclosed in Figure 1 the eletromagnet 312 is electrically connected to the battery 400 by a conductor 428, the conductor 402 and all but the conductor 382 of the previously described electrical means connecting the battery and the electromagnet 308. The electromagnet 312 is electrically connected to the then closed grounded wind switch 317 by means of a conductor 430, the poles 432 and 433 and the movable contact plate 434 of the then closed three-pole switch 31 and a conductor 436. As to the closed electrical circuit effecting the energization of the electromagnet 308 this circuit includes the grounded wind switch 317, the conductor 436, the pole 433, the movable contact 434 and a pole 438 of the switch 31, a conductor 440, a part of the conductor 380, the electromagnet 308 and the previously described electrical means interconnecting said magnet with the grounded battery, all as disclosed in Figure 1.

Now when the electromagnets 308 and 312 are energized the movable contact 428 of the switch 310 and the movable contact 442 of the switch 314 are moved to close the switch 314 and open the switch 310. This operation results in a deenergization of the solenoid 116 and holding coil 98 of the motor unit 46 thereby effecting an energization of said unit by an operation of the spring 208, all as previously described. This operation also makes possible, by virtue of the closing of the switch 314 a momentary disabling of the ignition system as the motor unit is operating.

It is apparent therefore that when the accelerator is fully depressed the motor unit 46 is energized by the expansion of the spring 208 to establish the transmission in its kickdown setting, this operation being facilitated by momentarily disabling the ignition system to reverse the torque of the internal combustion engine. If the engine is operating at a relatively high speed, which operation usually results in a relatively high vehicle speed, say 50 M. P. H., then this kickdown operation of the motor unit is not effected when the accelerator is depressed far enough to close the switch 31; for the wind switch 67 is then opened thereby making it impossible to complete the electrical circuits to energize the electromagnets of the relay mechanism 302.

Continuing the description of a cycle of operations of the mechanism disclosed in Figure 1 it will be assumed that the kickdown operation of the transmission served its purpose of enabling the driver to quickly pass the other car on the road. The driver will then probably again release the accelerator sufficiently to again energize the motor unit 46 by vacuum to effect an upshift operation of the transmission. To bring the vehicle to a stop the accelerator is released and when the speed of the vehicle is decreased below governor speed the motor unit will, by virtue of the closing of the governor operated switch 64, again be energized by the spring 208 to effect another kickdown operation of the transmission. The disengagement of the friction clutch by the motor 328 will of course facilitate this operation.

Concluding the discussion of the mechanism disclosed in Figure 1, it is to be noted that by virtue of the incorporation of the ignition switch 396 in the wiring between the battery and the relay switch 310, said ignition switch serves the useful function, when it is opened, of insuring a deenergization of the solenoid 116 and holding coil 98 despite a failure of operation of the relay mechanism; for should this relay mechanism fail in its operation of opening the switch 310, that is, opening the electrical circuit from the solenoid and holding coil to the battery when the car is being brought to a stop below governor speed, then the compartment 198 of the motor unit 46 would, by virtue of the pumping action of the engine pistons, continue to be partially evacuated to hold the power element of the motor unit in its upshift position and the then energized holding coil would continue to function to hold the power element in this position. This operation would result in the transmission being established in an undesired gear ratio setting when the car is brought to a stop. This setting of the transmission, that is, the higher of the two gear ratio settings effected by the operation of the motor unit 46, is particularly undesirable when the car is brought to a stop on an incline; for when the vehicle is then again started in motion the engine, because of the relatively high gear ratio setting of the transmission, might be stalled. Now by the incorporation of the ignition switch in the electrical circuit interconnecting the battery, the solenoid 116 and the holding coil 98 there is provided a mechanism which prevents this undesired result; for when the driver, either intentionally or unintentionally opens the ignition switch before the car rolls to a stop the solenoid 116 and holding coil 98 are automatically deenergized and this operation results in connecting the motor compartment 198 to the atmosphere thereby effecting a downshift operation of the motor unit. When the driver brings the car to a stop in a conventional manner he usually opens the ignition switch to stop the engine after the car is stopped in the desired position; however, the principal virtue of the above described mechanism lies in the fact that should the driver carelessly cut off the ignition switch as the car is being brought to a stop or on an incline the transmission will, because of this very act, be established in its downshift setting.

There is thus provided in the mechanism disclosed in the several figures of the drawing a power plant for an automotive vehicle requiring of the driver but a minimum of mental and physical effort in the control thereof. The controls for said power plant, all of which constitute a part of my invention, consist of the accelerator, an ignition switch, a governor operated switch, a clutch pedal, and a transmission operating shift lever. These elements control the operation of the internal combustion engine, the ignition system, a fluid clutch, a friction clutch, a changespeed transmission and power means constituting part of the means for operating said transmission. The accelerator operates a switch for controlling the operation of the transmission and also operates the throttle of the engine thereby controlling the engine torque and the operation of the fluid clutch. The ignition switch constitutes not only a part of the ignition system which in part controls the operation of the internal combustion engine, but also serves to in part control the operation of the transmission operating power means. The clutch pedal cooperates with the fluid clutch to control the connection between the engine and the transmission; the shift lever cooperates with the transmission operating power means to effect an operation of the transmission and the governor operated switch cooperates with the accelerator operated switch to control the operation of the transmission operating power means.

It may be added that with the embodiment of my invention disclosed in Figure 1 the accelerator, clutch pedal and governor operated switch of the aforementioned controls cooperate to control the operation of the friction clutch; and the accelerator and the governor operated switch serve as part of the means for controlling both a clutch operating power means and the aforementioned transmission operating power means.

In short, all of the aforementioned five controls cooperate to make of the power plant an efficient and effective means for propelling the vehicle.

Although this invention has been described in connection with certain specific embodiments, the principles involved are susceptible of numerous other applications that will readily occur to persons skilled in the art. The invention is, therefore, to be limited only as indicated by the scope of the appended claims.

I claim:

1. In an automotive vehicle provided with a change-speed transmission, a friction clutch, an accelerator, an accelerator operated switch mechanism comprising a transmission and ignition controlling switch and a clutch control switch, a vehicle speed responsive governor, a governor operated switch for controlling the operation of the clutch and the transmission and an ignition system for in part controlling the operation of said engine, power means, including the governor, the governor operated switch and the accelerator operated switch mechanism, for operating the friction clutch, in part operating the transmission and in part controlling the operation of the ignition system, said power means including a clutch operating pressure differential operated motor unit comprising a control valve mechanism and means for operating said valve mechanism, a transmission operating and ignition controlling pressure differential and spring operated motor unit comprising a power element, a control valve, means for operating the valve, a power element holding coil and an ignition interrupter switch, said power means further including means for controlling the operation of the clutch control valve operating means and for controlling the operation of the holding coil and the valve operating means of the transmission operating and ignition controlling motor unit, said control means including a relay mechanism, the parts of the aforementioned power means being so constructed and arranged and so operative that when the accelerator is depressed beyond its full throttle open position the aforementioned transmission and ignition controlling switch is operated, which operation initiates a kickdown operation of the aforementioned transmission operating and ignition controlling motor unit and a momentary disabling of the ignition system to facilitate this operation of said motor unit, said power means being also so operative that when the accelerator is completely released and the speed of the vehicle drops below a predetermined factor there is effected an operation of the clutch and transmission controlling governor operated switch and an operation of the accelerator operated clutch control switch whereby there is initiated a kickdown operation of the motor unit and a clutch disengaging operation of the clutch control power means, the latter operation serving to facilitate the kickdown operation by virtue of the operation of uncoupling the engine from the transmission.

2. In an automotive vehicle provided with a power plant including an internal combustion engine provided with an intake manifold, an ignition system for in part controlling the operation of said engine, an accelerator, a vehicle speed responsive governor, a fluid coupling having its impeller connected with the drive shaft of the engine, a friction clutch having its driving plate connected with the runner of the fluid coupling and a power and manually operated change-speed transmission having its main driving pinion connected to the driven plate of the friction clutch, means for operating the clutch and transmission comprising a clutch pedal operably connected to the driven clutch plate and manually operated to disengage the clutch prior to starting the engine, power means for operating the clutch to facilitate the starting of the vehicle from rest after the transmission has been manually operated to establish the same in a relatively low gear ratio setting, said power means comprising a vacuum operated motor, a conduit interconnecting the motor with the intake manifold, valve means including a three-way valve and an accelerator operated bleed valve for controlling the operation of said motor, said means being operative to so control the clutch engaging operation of said motor that the friction clutch cooperates with the fluid coupling in effecting a smooth start of the vehicle from rest, a solenoid for operating the three-way valve and means for controlling the operation of said solenoid including an accelerator operated switch and a switch operated by the aforementioned governor, manually operated means for establishing the transmission in a relatively low gear ratio setting and power means, cooperating with the fluid coupling and with the internal combustion engine when the latter is being operated to effect a relatively low gaseous pressure in its intake manifold, for effecting the higher of two different settings of the change-speed transmission and for momentarily disabling the ignition system to facilitate the operation of the power means when the same effects the lower of the aforementiond two different settings, said last mentioned power means including a motor unit and means for controlling the operation of said unit comprising an accelerator operated switch and the aforementioned governor operated switch, all of the parts of the aforementioned mechanism being so constructed and so arranged that there may be effected a smooth start of the vehicle from rest in a relatively low gear setting of the transmission and a shift of the transmission by the motor unit when the same is controlled by an operation of the accelerator and governor.

3. In an automotive vehicle provided with a change-speed transmission, a friction clutch, an accelerator, an accelerator operated switch mechanism comprising a transmission and ignition controlling switch and a clutch control switch, a vehicle speed responsive governor, a transmission and clutch controlling governor operated switch and an ignition system for in part controlling the operation of said engine; power means, including the governor, the governor operated switch and the accelerator operated switch mechanism, for operating the friction clutch, in part operating the transmission and in part controlling the operation of the ignition system, said power means including a clutch operating pressure differential operated motor unit comprising a control valve mechanism and means for operating said valve mechanism, a transmission operating and ignition controlling pressure differential and spring operated motor unit comprising a power element, a power element holding coil and an ignition interrupter switch, a control valve for said motor unit, means for operating the valve, said power means further including means for controlling the operation of the clutch control valve operating means and for controlling the operation of the holding coil and the valve operating means of the transmission operating and ignition controlling motor unit, said control means including a relay mechanism, the parts of the aforementioned power means being so constructed and arranged and so operative that when the accelerator is depressed beyond its full throttle open position the aforementioned transmission and ignition controlling switch is operated, which operation initiates a kickdown operation of the aforementioned transmission operating and ignition controlling motor unit and a momentary disabling of the ignition system to facilitate this operation of said motor unit, said power means being also so operative that when the accelerator is completely released and the speed of the vehicle drops below a predetermined factor there is effected an operation of the clutch and transmission controlling governor operated switch and an operation of the accelerator operated clutch control switch whereby there is initiated a certain operation of the motor unit and a clutch disengaging operation of the clutch control power means, the latter operation serving to facilitate the latter operation of the motor unit by virtue of the operation of uncoupling the engine from the transmission.

4. In an automotive vehicle provided with a power plant including an internal combustion engine provided with an intake manifold, an ignition system for in part controlling the operation of said engine, an accelerator, a vehicle speed responsive governor, a fluid coupling having its impeller connected with the drive shaft of the engine, a friction clutch having its driving plate connected with the runner of the fluid coupling and a power and manually operated change-speed transmission having its main driving pinion connected to the driven plate of the friction clutch, means for operating the clutch and transmission comprising a clutch pedal operably connected to the driven clutch plate and manually operated to disengage the clutch prior to starting the engine, power means for operating the clutch to facilitate the starting of the vehicle from rest after the transmission has been manually operated to establish the same in a relatively low gear ratio setting and to facilitate a certain operation of the transmission by power means, said clutch operating power means comprising a vacuum operated motor, a conduit interconnecting the motor with the intake manifold, valve means including a three-way valve and an accelerator operated bleed valve for controlling the operation of said motor, said power means being operative to so control the clutch engaging operation of said motor that the friction clutch cooperates with the fluid coupling in effecting a smooth start of the vehicle from rest, a solenoid for operating the three-way valve and means for controlling the operation of said solenoid including an accelerator operated switch and a switch operated by the aforementioned governor, manually operated means for establishing the transmission in a relatively low gear ratio setting and power means, cooperating with the fluid coupling and with the internal combustion engine when the latter is being operated to effect a relatively low gaseous pressure in its intake manifold, for effecting the higher of two different settings of the change-speed transmission and for effecting a momentary disabling of the ignition system to facilitate the operation of establishing the transmission in the lower of the aforementioned two different settings, said last mentioned power means including a motor unit and means for controlling the operation of said unit comprising an accelerator operated switch and the aforementioned governor operated switch, all of the parts of the aforementioned mechanism being so constructed and so arranged that there may be effected a smooth start of the vehicle from rest in a relatively low gear setting of the transmission and an operation of the transmission by the motor unit when the same is controlled by an operation of the accelerator and the governor.

5. In an automotive vehicle provided with a power plant including an internal combustion engine provided with an intake manifold, an ignition system for in part controlling the operation of said engine, an accelerator, a vehicle speed responsive governor, a fluid coupling having its impeller connected with the drive shaft of the engine, a friction clutch having its driving plate connected with the runner of the fluid coupling and a power and manually operated change-speed transmission having its main driving pinion connected to the driven plate of the friction clutch, means for operating the clutch and transmission comprising a clutch pedal operably connected to the driven clutch plate and manually operated to disengage the clutch prior to starting the engine, power means for operating the clutch to facilitate the starting of the vehicle from rest after the transmission has been manually operated to establish the same in a relatively low gear ratio setting and to facilitate a certain operation of the transmission by power means, said clutch operating power means comprising a vacuum operated motor, a conduit interconnecting the motor with the intake manifold, valve means including a three-way valve and an accelerator operated bleed valve for controlling the operation of said motor, said power means being operative to so control the clutch engaging operation of said motor that the friction clutch cooperates with the fluid coupling in effecting a smooth start of the vehicle from rest, a solenoid for operating the three-way valve and means for controlling the operation of said solenoid including an accelerator operated switch and a switch operated by the aforementioned governor, manually operated means for establishing the transmission in a relatively low gear ratio setting and power means, cooperating with the fluid coupling and with the internal combustion engine when the latter is being operated to effect a relatively low gaseous pressure in its intake manifold, for effecting the higher of two different settings of the change-speed transmission and for effecting a momentary disabling of the ignition system to facilitate an operation of establishing the transmission in the lower of the aforementioned two different settings, said last mentioned power means including a motor unit and means for controlling the operation of said unit comprising an accelerator operated switch and the aforementioned governor operated switch, all of the parts of the aforementioned mechanism being so constructed and so arranged that there may be effected a smooth start of the vehicle from rest in a relatively low gear setting of the transmission and an operation of the transmission by the motor unit when the same is controlled by an operation of the accelerator and the governor.

6. In an automotive vehicle provided with an internal combustion engine, an accelerator, an ignition system for in part controlling the operation of said engine, a change-speed transmission mechanism, a vehicle speed responsive governor, and a friction clutch, means for operating the transmission mechanism, controlling the operation of the ignition system to facilitate a certain operation of said transmission mechanis and for operating the friction clutch to facilitate a certain operation of the transmission mechanism, said power means comprising a motor for operating a part of the transmission mechanism and in part controlling the operation of the ignition system, another motor for operating the friction clutch and means for controlling the operation of said motors including an accelerator operated switch mechanism and a governor operated switch, said accelerator and governor thereby constituting common controls of the control means for both of said motors.

7. In an automotive vehicle provided with a power plant comprising an internal combustion engine, an accelerator, a vehicle speed responsive governor, an ignition system for in part controlling the operation of said engine, a change-speed transmission and a friction clutch incorporated in the power plant between the engine and transmission and operable to facilitate an operation of the transmission, means for operating the transmission mechanism, for controlling the operation of the ignition system to facilitate a certain operation of the transmission and for operating the friction clutch to facilitate a certain operation of the transmission, said power means comprising a motor for operating a part of the transmission and in part controlling the operation of the ignition system, electrical means, including a switch associated with the latter motor, for controlling the operation of the ignition system, another motor for operating the friction system and means for controlling the operation of said motors comprising a valve for controlling the operation of the transmission and ignition controlling motor, a solenoid constituting part of means for operating said valve, a valve for controlling the operation of the clutch operating motor, a solenoid constituting part of means for operating the latter valve, an accelerator operated switch mechanism, a governor operated switch consisting of a fixed contact and a movable contact and electrical means operatively interconnecting all three of the aforementioned switch mechanisms and both of the aforementioned solenoids, said electrical means and the remainder of the aforementioned mechanism being so constructed and so operative that with the vehicle at rest, when the accelerator is released and the engine is idling, there results a disengagement of the friction clutch, that upon depressing the accelerator the clutch is then engaged to get the vehicle under way, and that when the vehicle speed then reaches a certain factor and the accelerator is released, the transmission is operated to effect a relatively high gear setting thereof.

8. In an automotive vehicle provided with a power plant including a friction clutch, a change-speed transmission, an accelerator and a vehicle speed responsive governor; means operative to alternately effect two settings of the transmission; operative to render the internal combustion engine inoperative as a driving means for the vehicle when the accelerator is depressed beyond its wide open throttle position and operative, with a certain operation of the governor and the accelerator, to disengage the clutch to thereby facilitate an operation of the transmission to effect one of its settings, said means including a clutch operating motor, a transmission operating motor, valve means for controlling the operation of said motors and electrical means for controlling the operation of said valve means including a governor operated switch and an accelerator operated switch mechanism.

9. In an automotive vehicle provided with a power plant including a change-speed transmission, a friction clutch, an accelerator and a vehicle speed responsive governor; means, including manually operated means and power operated means, operative to effect an operation of the clutch and transmission the transmission being alternately operated by the power means to effect two of its settings and operated by said power means, to effect one of the latter settings, when the accelerator is depressed beyond its full throttle open position, said clutch and transmission operating means including a transmission operating motor, a clutch operating motor, control means actuated by the accelerator and control means actuated by the aforementioned governor.

10. In an automotive vehicle provided with a power plant including a friction clutch, a change-speed transmission, an accelerator, an engine controlling ignition system and a vehicle speed responsive governor; means operative to alternately effect two settings of the transmission and also operative, with a certain operation of the accelerator, to momentarily disable the ignition to facilitate the operation of establishing the transmission in the lower gear ratio setting of the aforementioned two settings, and furthermore operative, with a certain operation of the governor and the accelerator, to disengage the clutch to thereby facilitate an operation of the transmission to effect the last-mentioned setting thereof, said means including a clutch operating motor, a transmission operation and ignition controlling motor, and means for controlling the operation of said motors including a governor operated switch and an accelerator operated switch mechanism.

11. Power means for operating a change speed transmission including a motor unit comprising a casing, a power element within said casing, a connecting rod secured to said power element and projecting from one end of the casing, a switch operating member housed within said casing and adapted to be actuated by said power element, and a breaker switch housed within said casing and actuated by said switch operating member, a three way valve mechanism for controlling the operation of the motor unit, electromagnetic means operable when energized, to so operate the valve mechanism as to effect an energization of the power means to move the power element to one of its operative positions and other electro-magnetic means operable to load said power element and thereby maintain it in said operative position so long as the electromagnet remains energized.

12. In an automotive vehicle provided with an engine controlling ignition system and a change speed transmission, power means for operating the transmission and in part controlling the ignition system, said power means including a motor unit comprising a casing having housed therein a transmission operating power element and an ignition interrupter switch constituting a part of the power means for controlling the ignition system, a valve for controlling the operation of the motor unit, electromagnetic means for controlling the operation of said valve and other electromagnetic means for holding said power element in one of its operative positions, and means for operating said switch comprising a power element operated force transmitting means including a lost motion means the parts of which are so constructed and arranged that when the motor unit is operative to effect a certain operation of the transmission the switch is closed and when the motor unit is operative to effert another operation of the transmission the switch remains closed for a predetermined period of time during the first part of said operation and then opens after the power element of the motor unit has moved a certain distance.

13. In an automotive vehicle provided with an engine controlling ignition system and a change speed transmission, power means for operating the transmission and in part controlling the ignition system, said power means including a motor unit comprising a casing having housed therein a transmission operating power element, electromagnetic means for operating said valve and other electromagnetic means for holding said power element in one of its operative positions, an ignition interrupter switch housed within said casing, said switch constituting a part of the power means for controlling the ignition system, and means for operating said switch comprising a power element operated force transmitting means including a hollow connecting rod connected to the power element, a reciprocable switch operating rod extending through the last mentioned electromagnetic means and housed within said connecting rod, and a spring providing a lost motion connecting means whereby there is provided, by said force transmitting means, a means operative, when the motor unit is operative to effect a certain operation of the transmission, to effect a closing operation of the switch and whereby there is also provided, by said force transmitting means a means operative when the motor unit is operative to effect another operation of the transmission, for effecting by virtue of the operation of said spring, a delay in the opening of said switch.

HAROLD W. PRICE.

REFERENCES CITED

The following references are of record in the file of this patent:

UNITED STATES PATENTS

| Number | Name | Date |
|---|---|---|
| 2,051,553 | Fleischel | Aug. 18, 1936 |
| 2,152,089 | Price et al. | Mar. 28, 1939 |
| 2,225,493 | Barnes | Dec. 17, 1940 |
| 2,237,944 | Maurer | Apr. 8, 1941 |
| 2,296,290 | Mayrath | Sept. 22, 1942 |
| 2,309,468 | Matulaitis | Jan. 26, 1943 |
| 2,349,185 | Matulaitis | May 16, 1944 |
| 2,425,890 | Matulaitis | Aug. 19, 1947 |